(12) United States Patent
Petrovic

(10) Patent No.: US 8,412,759 B2
(45) Date of Patent: Apr. 2, 2013

(54) SYSTEM AND METHOD FOR ACTIVE DIPLEXERS

(75) Inventor: Branislav Petrovic, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 1314 days.

(21) Appl. No.: 12/163,787

(22) Filed: Jun. 27, 2008

(65) Prior Publication Data

US 2009/0327384 A1    Dec. 31, 2009

(51) Int. Cl.
*G06F 17/10* (2006.01)
(52) U.S. Cl. .................................................. 708/300
(58) Field of Classification Search .................... 708/300
See application file for complete search history.

(56) References Cited

U.S. PATENT DOCUMENTS

| 5,066,923 | A | 11/1991 | Gailus et al. |
| 6,035,186 | A | 3/2000 | Moore et al. |
| 6,625,436 | B1 | 9/2003 | Tolson et al. |
| 2002/0136275 | A1* | 9/2002 | Wight ............................. 375/146 |
| 2003/0210093 | A1* | 11/2003 | Zhang ............................. 330/149 |
| 2007/0161356 | A1 | 7/2007 | Hoon et al. |

* cited by examiner

*Primary Examiner* — Tan V. Mai
(74) *Attorney, Agent, or Firm* — Bruce Greenhaus; Sheppard Mullin Richter & Hampton LLP

(57) ABSTRACT

Methods and systems for signal filtering in electronic devices are provided. More particularly, methods and systems for filtering of radio frequency (RF) signals are provided. A filter circuit may comprise a down-converter, a filter, coupled to the down-converter and configured to filter the down-converted signal, and an up-converter, coupled to the filter. A filter circuit may also comprise a combining circuit, coupled to the up-converter and configured to combine the filtered, up-converted signal and the input signal.

32 Claims, 20 Drawing Sheets

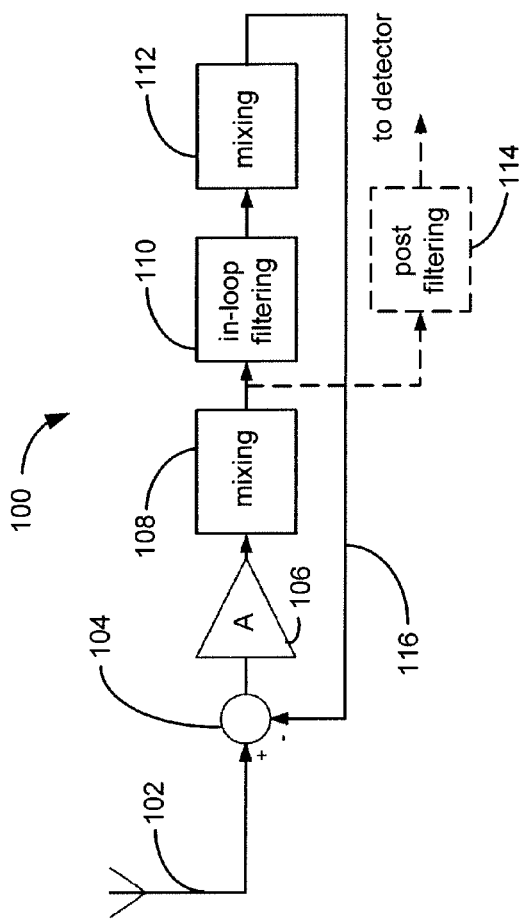
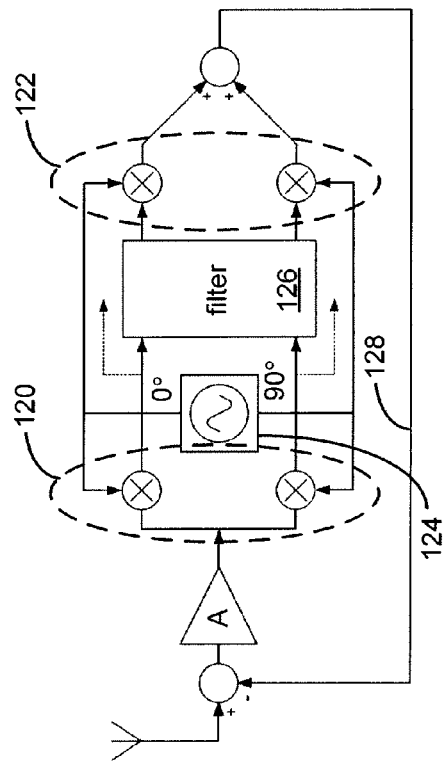

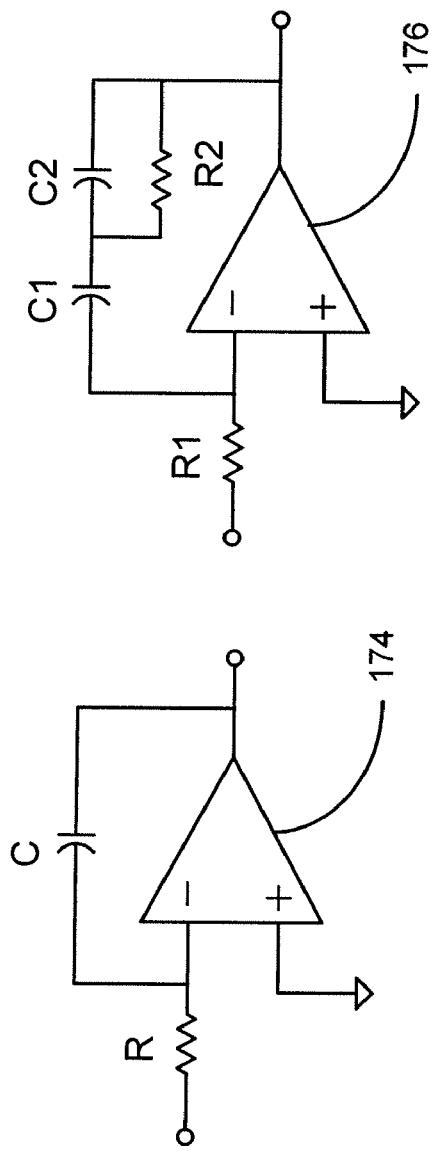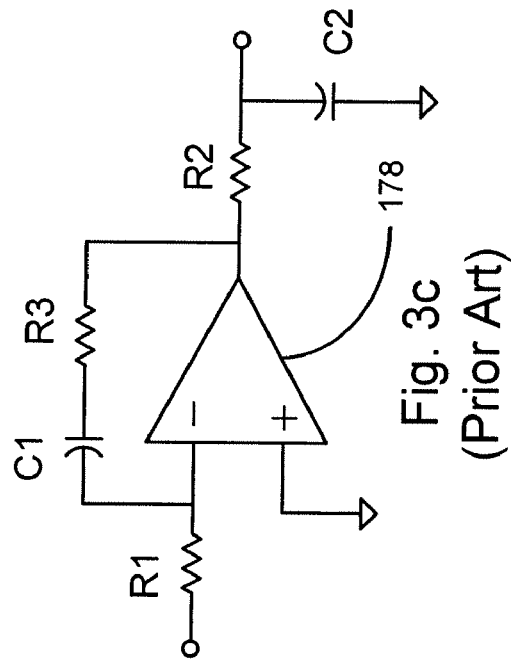
Fig. 3a (Prior Art)
Fig. 3b (Prior Art)
Fig. 3c (Prior Art)

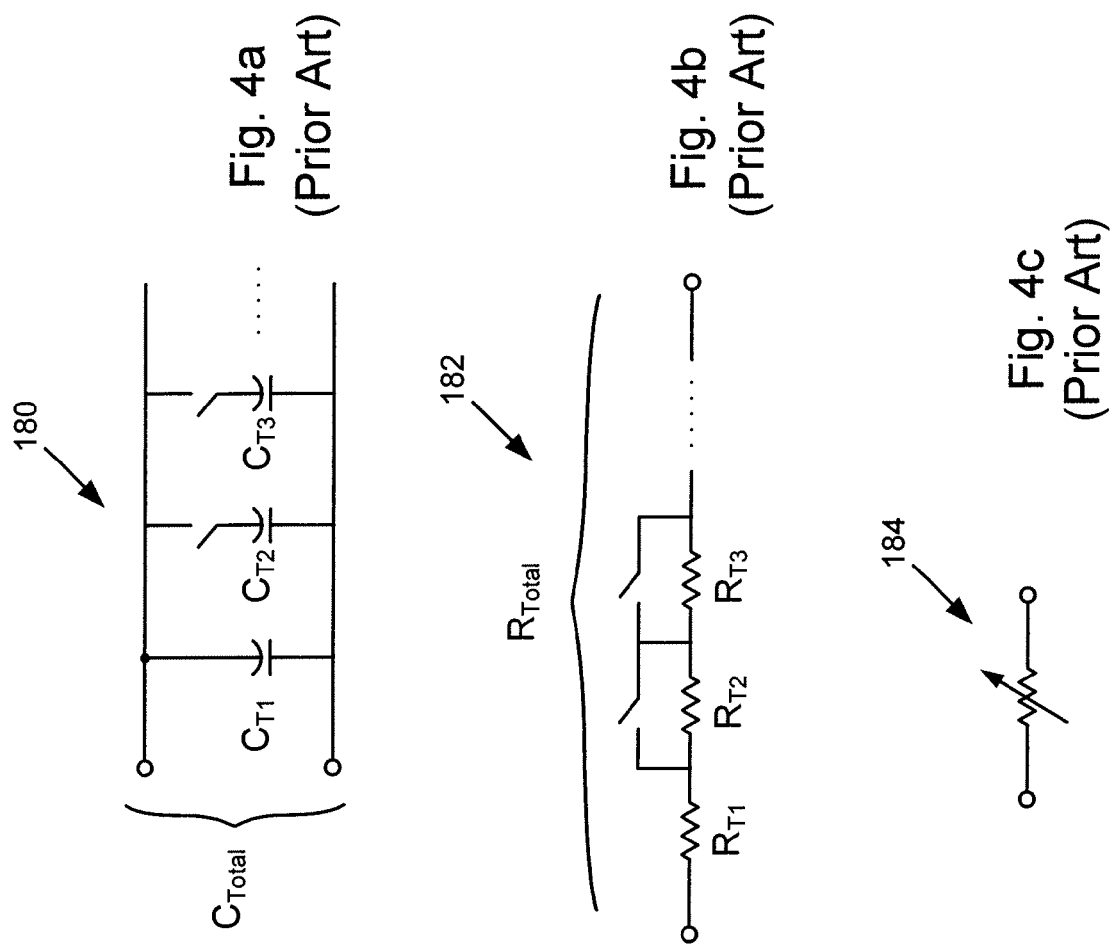

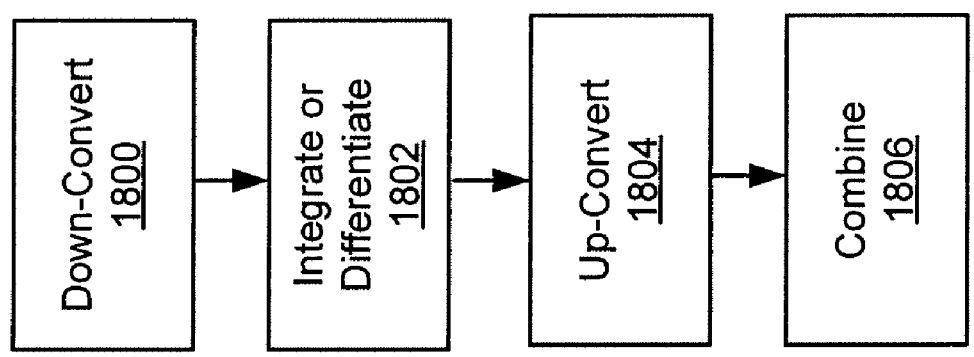

SYSTEM AND METHOD FOR ACTIVE DIPLEXERS

TECHNICAL FIELD

The present invention relates to methods and systems for signal filtering in electronic devices and more particularly, some embodiments related to methods and systems for filtering radio frequency (RF) signals.

DESCRIPTION OF THE RELATED ART

With the many continued advancements in communications and data transfer technology, more and more devices are being introduced in both the consumer and commercial sectors with advanced, high bandwidth communications capabilities. Additionally, advances in processing power and low-power consumption technologies have led to the proliferation of communications capabilities in various products on a widespread basis.

To address the growing demand for a digital home networking market, a consortium of industry leading companies formed the Multimedia over Coax Alliance, or MoCA™. The MoCA protocol distributes digital entertainment over available bandwidth on the coaxial cable that is installed in households for cable or satellite TV service. The initial MoCA specification was approved in February 2006, and routers with built-in MoCA capabilities, MoCA set-top boxes and MoCA adapters followed shortly thereafter.

Other communication networks geared toward the home include: Power line communication networks, which carry data over home electrical wiring (e.g., HomePlug Powerline Alliance or Universal Powerline Association); HPNA networks, which carry data over telephone wiring; and wireless networks such as those specified by IEEE 802.15.1 (Blue-Tooth®), IEEE 802.11 (WiFi), IEEE 802.16 (WiMax) and IEEE 802.15.1 (ZigBee).

One commonly used device in many electronic systems, including networking devices, is signal filters. Generally, the filtering goal is to pass or extract a desired signal, suppress undesired signals or both. The unwanted signals in many applications are those signals closely spaced to a desired signal. In many cases, the undesired signals are be much stronger than the desired signal. These undesired signals are often outside of the desired channel but inside the operating frequency range or band of an electronic device, that is processing the desired signal. In some cases, the undesired signals are outside of the band used by the electronic device but not far from the edge of the band.

Signals with frequencies that are farther away from a frequency of interest, usually present less of a problem. This is because these out-of-band signals have a larger frequency separation from the frequency of interest. Because of this, the signals are more easily filtered out. A fixed-frequency bandpass filter at the input of the system (e.g. a receiver) or output (e.g. a transmitter) can be used to filter the out-of-band signals. Often suppression or removal of a strong interferer at a receiver front-end is important in order to prevent degradation of a desired signal due to a potential nonlinear distortion, for example, intermodulation, compression, receiver desensitization, etc. These nonlinear distortions are caused by the presence of a strong interferer.

FIG. 1a illustrates the basic setup of a receiver front-end 100 that includes feedback 116. The front-end 100 includes an antenna 102 for receiving electromagnetic signals. These signals are input into an amplifier 106 through a summing circuit 104. The amplifier 106 can increase the amplitude of the received signal. After amplification, the signal is input into a mixer 108 to translate the frequency of the received signal to another frequency. This translated signal can then be filtered using in-loop filter 110. The filtered signal may then be input into mixer 112 to translate the frequency of the filtered signal back up to radio frequency so that feedback 116 is subtracted from the input signal using summing circuit 104. As illustrated in FIG. 1a, the signal from the mixer 108 may also be filtered using post filter 114. The filtered signal may then be output to a detector. Additionally, in some cases, more mixers, filters and feedback paths may also be used.

FIG. 1b is another example, further illustrating receiver front-end circuitry. The mixing circuitry 108 of receiver front end 100 may include a quadrature demodulator 120. Similarly, the mixing circuitry 112 of receiver front end 100 may also include a quadrature modulator 122. As illustrated in FIG. 1b, the quadrature demodulator 120 and the quadrature modulator 122 share a common mixing signal source 124. A signal is input into quadrature demodulator 120 to translate the frequency of the received signal to another frequency. This translated signal can then be filtered using the filter 126. The filtered signal may then be input into quadrature modulator 122 to translate the frequency of the filtered signal back up to radio frequency so that feedback 128 is subtracted from the input signal using a summing circuit.

FIG. 1c illustrates another example of negative feedback used in conjunction with power amplifiers. This example is not in the area of signal filtering, but rather in the domain of signal linearization. The figure illustrates an example of a scheme utilizing negative feedback in a closed loop system. In FIG. 1c the negative feedback is employed in order to linearize the power output 150 of the power amplifier. The linearization may reduce the nonlinear distortions of the power output 150. It is achieved by feeding a sample of the signal 152 at the output of the power amplifier (PA) via directional coupler 154 into a quadrature demodulator 156. The quadrature outputs 158 and 160 of the system are then summed with the input signals I and Q in combiners 162 and 164 respectively. The signal is then fed back into the modulator 166 using summing circuits. A distortion occurring at the output signal 150 will be demodulated in quadrature demodulator 156. It will then be subtracted from the original undistorted signal and fed back as an error signal into the quadrature modulator 156. This feedback is in phase opposition with respect to distortion, thus cancelling or substantially correcting the distortion.

The amplitude, phase and delay profile vs. frequency of each of the described building blocks of the systems and methods described herein, along with the phase and amplitude property of all interconnects between the individual blocks are important for the system performance and stability, as discussed. FIGS. 2-3 illustrate various integration circuits that can be used in conjunction with the systems and methods described herein. These circuits are well known to those in the art, but are reviewed briefly here.

FIG. 2a is a diagram illustrating an example of a charge pump integrator 170 that is used in conjunction with some embodiments of the systems and methods described herein. Referring now to FIG. 2a, the charge pump integrator 170 is modeled using the following equations:

$$I(s) = gm \cdot V1(s)$$

The transfer function of the charge pump integrator 700 is:

$$\frac{V2(s)}{V1(s)} = \frac{1}{s \cdot \tau} \text{ with } \tau = \frac{C}{gm}$$

FIG. 2b is a diagram illustrating an example of a charge pump integrator with lead-lag circuit 172 that is used in conjunction with some embodiments of the systems and methods described herein. Referring now to FIG. 2b, the charge pump integrator with lead-lag circuit 172 is modeled using the following equations:

$$I(s) = gm \cdot V1(s)$$

The transfer function of the charge pump integrator is:

$$\frac{V2(s)}{V1(s)} = \frac{1}{s \cdot \tau 1} \cdot \frac{1 + s \cdot \tau 2}{1 + s \cdot \tau 3} \text{ with } \tau 1 = \frac{C1 + C2}{gm}, \tau 2 = R1 \cdot C2$$
$$\text{and } \tau 3 = R1 \cdot C_1 \parallel C_2$$

FIG. 3a is a diagram illustrating an example of an op-amp integrator 174 that is used in conjunction with some embodiments of the systems and methods described herein. Referring now to FIG. 3a, the op-amp integrator 174 is modeled using the following equations:

$$-\frac{1}{s \cdot \tau} \text{ with } \tau = R \cdot C$$

FIG. 3b is a diagram illustrating an example of an op-amp integrator with lead-lag circuit 176 that is used in conjunction with some embodiments of the systems and methods described herein. Referring now to FIG. 3b, the op-amp integrator with lead-lag circuit 176 is modeled using the following equations:

$$-\frac{1}{s \cdot \tau 1} \cdot \frac{1 + s \cdot \tau 2}{1 + s \cdot \tau 3} \text{ with } \tau 1 = R1 \cdot C1, \tau 2 = R2 \cdot (C1 + C2)$$
$$\text{and } \tau 3 = R2 \cdot C2$$

FIG. 3c is a diagram illustrating another example of an op-amp integrator with lead-lag circuit 178 that is used in conjunction with some embodiments of the systems and methods described herein. Referring now to FIG. 3c, the op-amp integrator with lead-lag circuit 178 is modeled using the following equations:

$$-\frac{1}{s \cdot \tau 1} \cdot \frac{1 + s \cdot \tau 2}{1 + s \cdot \tau 3} \text{ with } \tau 1 = R1 \cdot C1,$$
$$\tau 2 = R3 \cdot C1 \text{ and } \tau 3 = R2 \cdot C2$$

FIG. 4a is a diagram illustrating an example of variable switched capacitors 180 that is used in conjunction with some embodiments of the systems and methods described herein. FIG. 4b is a diagram illustrating an example of variable switched resistors 182 that is used in conjunction with some embodiments of the systems and methods described herein. FIG. 4c is a diagram illustrating an example of variable Metal-Oxide Semiconductor (MOS) resistor 184 that is used in conjunction with the systems and methods described herein. Variable switched capacitors 180, variable switched resistors 182 and MOS resistors 184 are well known by those of skill in the art and will not be discussed further herein.

BRIEF SUMMARY OF EMBODIMENTS OF THE INVENTION

The present invention relates to methods and systems for signal filtering in electronic devices and more particularly, some embodiments related to methods and systems for filtering radio frequency (RF) signals. For example, some embodiments are used for filtering in Home Networking. One such example home network is Multimedia over Coax Alliance (MoCA). In various embodiments, MoCA is used with Community Antenna TV, or Cable TV (CATV) and Fiber to the Home (FTTH) systems. It might also be used in other home networking applications. Various embodiments may improve system dynamic range, receiver sensitivity, interference rejection, etc., when compared to some other systems. Additionally, in some embodiments MoCA is suitable for integration into monolithic integrated circuits (ICs) for low cost, high volume, performance demanding applications.

According to various embodiments, a filtering circuit may employ a closed loop system. These embodiments may utilize negative feedback for performing a signal filtering function. In some embodiments, a signal is filtered using a circuit that performs a frequency conversion of an input signal. After the frequency conversion the frequency-converted signal is filtered. This filtering may use a loop filter. In some embodiments, after the filtering, the signal is converted back to the original frequency and combined in phase opposition with the input signal. This effectively forms a closed loop, negative feedback system. The filtered signal is then converted back to the frequency of the original input signal. This signal is in phase opposition with the input signal. Accordingly, the signal in phase opposition with the input signal may cancel a portion of the input signal.

In some embodiments, a filter circuit may comprise a down-converter and a filter that is coupled to the down-converter. This filter is configured to filter the down-converted signal in some embodiments. Additionally, an up-converter is coupled to the filter. Various embodiments might also include a combining circuit, coupled to the up-converter and configured to combine a feedback signal and the input signal.

In some embodiments, the down-converter may comprise an I and Q mixer. Similarly, the up-converter may comprise an I and Q mixer. Additionally, in various embodiments, the down-converter and the up-converter are driven by a quadrature local oscillator. In this way the I and Q channels of an input signal are filtered. In some embodiments, the local oscillator signal is phase advanced by some amount φ relative to the output of the local oscillator. This is done to counter undesired phased delay.

In some embodiments, the filter is an integrator or a differentiator. For example, an integrator may perform the function of a loop filter. The integrator may improve loop stability when compared to, for example, a system using a low pass filter. Additionally, in some embodiments, the filter may comprise a cascade of integrators or a cascade of differentiators. In some cases, cascading of integrators is done to achieve a steeper filter rejection. Some embodiments may include a center frequency that is tunable and a bandwidth is adjustable-based. In various embodiments, a filter is made of several filter cascaded to the first filter by connecting the input of the second filter to the output of the first filter. The loop filter might include a digital filter in some embodiments.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1a is a diagram illustrating an example implementation of a receiver front end with feedback.

FIG. 1b is another diagram illustrating an example implementation of a receiver front end with feedback.

FIG. 3a is a diagram illustrating an example of an op-amp integrator that is used in conjunction with some embodiments of the systems and methods described herein.

FIG. 3b is a diagram illustrating an example of an op-amp integrator with lead-lag circuit that is used in conjunction with some embodiments of the systems and methods described herein.

FIG. 3c is a diagram illustrating another example of an op-amp integrator with lead-lag circuit that is used in conjunction with some embodiments of the systems and methods described herein.

FIG. 4a is a diagram illustrating an example of variable switched capacitors that is used in conjunction with some embodiments of the systems and methods described herein.

FIG. 4b is a diagram illustrating an example of variable switched resistors that is used in conjunction with some embodiments of the systems and methods described herein.

FIG. 4c is a diagram illustrating an example of variable Metal-Oxide Semiconductor (MOS) resistor that is used in conjunction with some embodiments of the systems and methods described herein.

FIG. 18 is a flowchart illustrating an example method in accordance with the systems and methods described herein.

The figures are not intended to be exhaustive or to limit the invention to the precise form disclosed. It should be understood that the invention can be practiced with modification and alteration, and that the invention is only limited by the claims and the equivalents thereof.

DETAILED DESCRIPTION OF THE EMBODIMENTS OF THE INVENTION

The present invention relates to methods and systems for signal filtering in electronic devices and more particularly, some embodiments related to methods and systems for filtering radio frequency (RF) signals. For example, some embodiments are used for filtering in a home networking system. One such example home network is Multimedia over Coax Alliance (MoCA). In various embodiments, MoCA is used with Community Antenna TV, or Cable TV (CATV) and Fiber to the Home (FTTH) systems. It might also be used in other applications, including other home networking applications.

Figure 5:
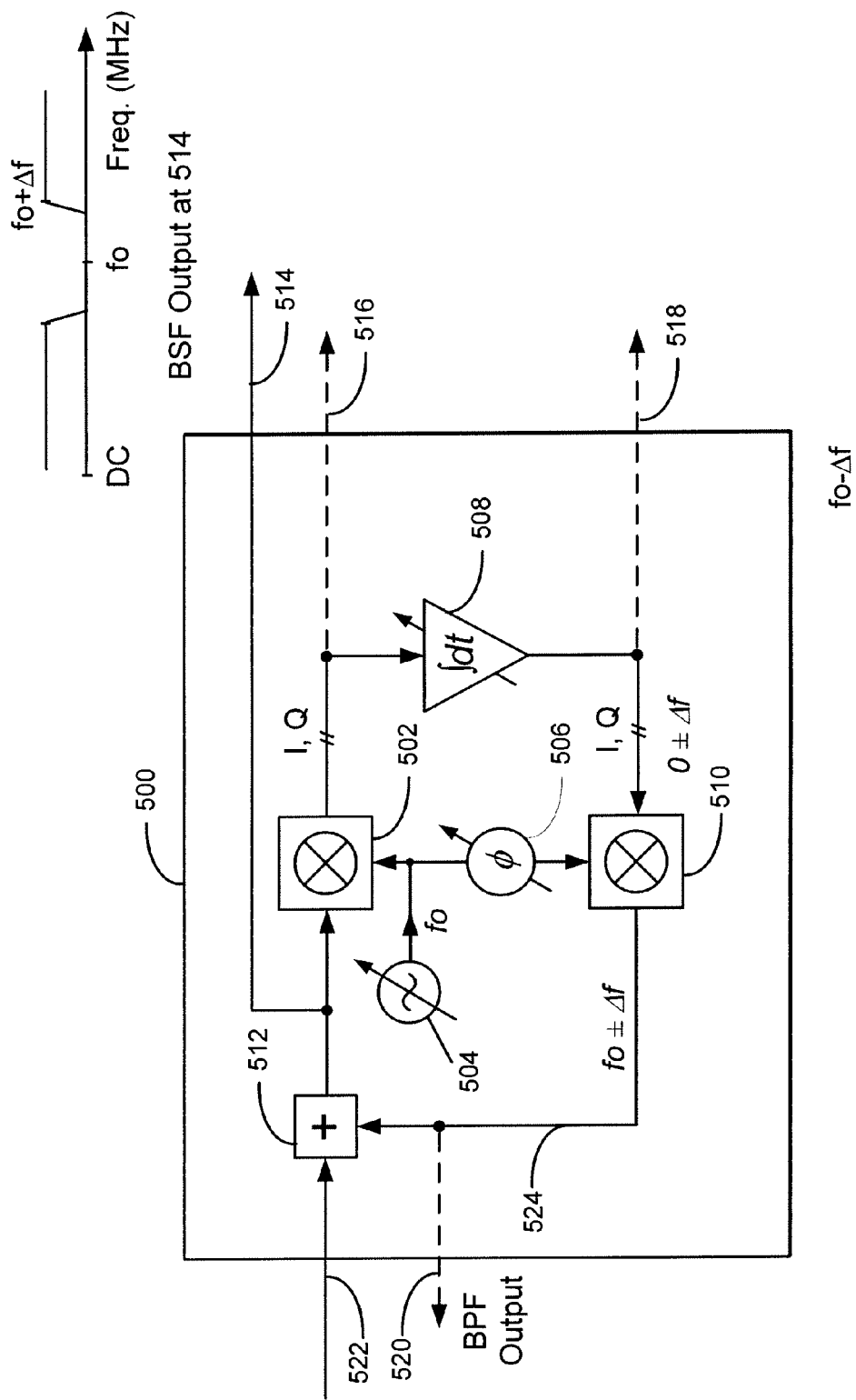
FIG. 5 is a diagram illustrating an example of an active band-stop filter with tunable center frequency and adjustable bandwidth.

FIG. 5 is a diagram illustrating an example of an active band-stop filter with tunable center frequency and adjustable bandwidth. Referring now to FIG. 5, in various embodiments, the filtering circuit 500 is a closed loop system utilizing negative feedback to performing a signal filtering function. The filtering circuit 500 accomplishes signal filtering by performing a direct frequency down-conversion of an input signal. This down-conversion is to zero IF and may use I and Q mixers 502. Additionally, these mixers are driven by quadrature oscillator 504. The filtering of the signal at the converted zero IF frequency is accomplished using integrator 508.

The integrator 508 may perform the function of a loop filter. After the filtering, the signal is up-converted back to the original frequency by another set of the I and Q mixers 510. This is done using the same oscillator 504, which may have a shifted phase using phase advance 506 described below. The reconverted signal may then be combined in phase opposition with the input signal. This effectively forms a closed loop, negative feedback system.

Using the integrator 508, a portion of the signal frequencies that falls at the higher range of the zero IF frequencies is selectively blocked from circling in the feedback loop. Other frequency portions of the signal falling at the lower range of the zero IF are allowed to circle in the feedback loop. Accordingly, the loop determines which part of the signal spectrum will be cancelled upon combining with the main signal, and which part will not.

In some embodiments, the part of the signal frequency spectrum within the pass-band of the loop is cancelled by the negative feedback of the loop. This negative feedback is added to the input 522 in the combiner 512. The cancelled signal does not propagate through to the output 514. Other signal frequencies may not be cancelled in the combiner 512 and are passed to the output. The combining of the incoming signal and the feedback signal selectively cancels only the frequency terms that passed through the loop. The terms that do not pass through the loop remain unaffected. In this way, the circuit of FIG. 5 may filter the input.

The example embodiment of FIG. 5 provides a complementary frequency response at the points before and after the combiner 512. At outputs 514 and 524, the response is complementary, or inverted, in respect to each other. The output 514 is a band stop filter (BSF) or notch filter and the output 524 is a band-pass filter (BPF). Four filtered outputs are illustrated in FIG. 5. In addition to the outputs 514 and 524 described above, which are at the same frequency as the input signal, the other two filtered outputs 516 and 518 are at the converted zero IF frequency. They exhibit the same type of filtering properties as 514 and 524, respectively, except they occur at zero IF frequency. In some embodiments, the converted signals at 516 and 518 at the zero IF frequency and 514 and 524 at RF frequency may have other conversion terms. These terms may include local oscillator leakage, signal leakage, local oscillator and signal harmonics, residual images, distortion products, etc. In general, some of those terms are undesired and need to be removed or suppressed.

The filtering circuit 500, as mentioned above, includes an integrator 508. This is in contrast to other systems, which use a loop filter in the form of a low pass filter (LPF). An integrator type filter may achieve loop stability, at the loop frequency where the open loop gain is close to 1 (0 dB), the total phase shift at this frequency around the loop must not be near 0° or multiples of 360°. Due to a negative feedback, there is an inversion in the loop amplifier or elsewhere in the loop, which takes up 180° of this budget, leaving less than 180° for the phase shift in the loop filter, assuming some margin. Generally, a margin of at least 45° is necessary to maintain the stability of the loop, on top of which another 45° may generally be needed for other loop elements. This might leave only 90° budget for the loop filter. Because of the phase shift through a low-pass filter increases continuously as a function of frequency from 0° at DC to a multiple of n×90°, n being the filter order, the above 90° budget puts the limit on the order of the LPF type of the loop filter to no more than the first order.

Accordingly, only the first order filter of the traditional type will have the acceptable phase shift, which will not exceed the 90° budget. On the other hand, the integrator used in various embodiments of the systems and methods described herein does not have a phase shift changing with frequency, but rather has a constant phase shift at all frequencies, equal to −90°. This property of the integrator may provide a stable operation of the loop at all frequencies, including the frequency where the open loop gain approaches unity. Using multiplicity of integrators in cascade may also provide stability, because it will produce a phase shift of −m×90° (m being the number of integrators) at all frequencies. These equally stable operating points provide loop stability. Accordingly, the integrator-based filter used in various embodiments, as illustrated in FIG. 5, may have a higher order, such as for example second order, as opposed to a mere first order filter. In some cases, a phase shift at frequencies close to DC may not be −90°, but rather closer to 0°, and the phase shift may transition to −90° over a range of frequencies above the HPF cutoff frequency. This may occur when, for example, a high pass filter (HPF) is used in series with the integrator in order to reduce the loop gain at DC and low frequencies. This can occur in systems with high loop gain, for example. In this transitional region, potential instability can exist if more than two integrators in cascade are used. In this case using two cascaded integrators, one with lead-lag circuits for improved phase margin can ensure circuit stability.

In some embodiments, other components, such as mixers, RF and baseband amplifiers, interconnects, etc., might add more phase delay in the loop. If this additional undesirable phase shift approaches a phase delay of 90°, the phase shift of the integrators may add to cause instability. In this case, measures may need to be taken to reduce or eliminate the additional phase shift or delay caused by other components in the loop. In various embodiments, this undesired phase delay may be corrected as described below.

In various embodiments, the undesired phase delay is countered by using a phase advance 506 inserted in the phase of the oscillator driving the converter mixers, as illustrated in FIG. 5. As illustrated by FIG. 5 and equation 1, the inserted phase φ into the oscillator drive propagates through the loop and advances the loop phase. Accordingly, this may counter the undesired phase delay, increasing the phase margin and stabilizing the loop.

The phase advance may be inserted in either arm of the oscillator circuit. For example, the lower arm is driven as illustrated in FIG. 5. The amount of the phase shift φ is optimized for the best operation of the loop. The phase shift φ is made programmable, to further provide an additional degree of freedom for loop stability optimization. For instance, the phase shift is adjusted as a function of the loop bandwidth, operating RF frequency or both. This may counter the possibly varying delays in the system as a function of these variables. Additionally, the phase delays may vary due to IC process, temperature or both. In various embodiments, this variable delay is tracked and corrected using, for example, a programmable phase shift.

As illustrated in FIG. 5, in order to match the input level 522, the signal level at the output of the mixer 510 is scaled in respect to the input level at 522 by the amount equal to 1/β, where β is the coupling coefficient of the combiner 512. This matching is done to provide cancellation. Using a passive combiner having β<1 the feedback signal at the mixer 510 is higher than the input signal at the mixer 522. This is necessary in order for the feedback signal, after being attenuated by β, to be able to match the input level at the combiner output 514. This is so that the feedback signal may still cancel the undesired interfering terms coming from the input 522. This implies that the dynamic range of the mixer 510 may need to be sufficiently high to be able to generate the required level without creating distortions that would degrade the desired signal after being combined with it.

The noise at the output of the mixer 510, after being attenuated by β in the combiner 512 is low enough not to degrade the noise level at the output 514. Both the potential distortion terms and the noise coming out of the mixer 510 are attenuated by β in the combiner 512 thus reducing their degrading effect by the same amount. To reduce the impact of noise, the signal level into mixer 502 (e.g. by increasing the incoming signal level at 522) is increased due to the filtering action of the circuit of FIG. 5. For example, in some embodiments, the signal level into the mixer 502 is increased because of the circuit's 502 suppression of interfering signals.

In some embodiments, a method is used to maximize the dynamic range and performance of the system by maintaining optimum signal power at the input of the mixer 502. This is done using an Automatic Gain Control (AGC) circuit in conjunction with, for example, the circuit illustrated in FIG. 5. One example is placing the AGC circuit at the input line 522.

In various embodiments, DC error terms and increased oscillator leakages in the down-converter and up-converter mixers is reduced using the systems and methods described herein. For example, by using integrators that may provide a strong negative feedback at DC, it is possible to reduce these errors. Additionally, the negative feedback may correct a DC leakage as a loop error term. Accordingly, the DC error is corrected or minimized by the loop. Additionally, flicker noise, which occurs close to DC, may also be reduced, similarly to other DC or near DC terms.

In some embodiments, the frequency conversion blocks 502 and 510 are realized by any type of the well known frequency conversion devices, such as, for example, mixers or multipliers of various kinds. These are arranged as complex Quadrature (I, Q) mixers providing single-sideband (SSB) or image-rejection (IR) conversion, double-quadrature mixers (with four mixers achieving both the SSB and the IR conversion), harmonic-suppression mixers, sampling mixers, etc. Additionally, mixer pre-amplifiers, mixer post-amplifiers or both may also be included in blocks 502 and 510. Some embodiments may include variable attenuation or variable gain amplifiers. By using a variable gain in the feedback loop the bandwidth of the filter circuit is controlled.

The signal combiner or coupler block 512 is embodied in practically any arrangement that results in combining of the signals, for instance as a well-known passive, non-directional or directional coupler, or as an active type of combiner. In various embodiments, coupling is based on capacitive, inductive or conductive mechanisms or some combination thereof. For example, a simple resistive combiner is used, or a directional coupler if isolation from/into the input port 522 is desired.

Some embodiments may use an active combiner, for example, a differential amplifier. This type of amplifier is available in ICs. The differential amplifier may have two inputs, one connected to the input 522, the other to the feedback return 524. Another embodiment of an active combiner might include a high-frequency high-gain amplifier operating as an op-amp. The op-amp circuit is configured with a feedback and a summing node at virtual ground. In this way, the circuit might perform a summing operation similarly to other op-amps. The circuit might, however, process signals at RF frequency.

Depending on the requirements, the local oscillator is embodied as a switched, tunable or fixed-tuned oscillator or a combination of these. The quadrature I and Q components of the local oscillator are generated by, for example, dividers, polyphase filters and similar devices. Additionally, the circuits used in conjunction with the systems and methods described herein are generally suitable for integration into one or more ICs. For example, the entire circuit of FIG. 5, including the integrators, may be realized in an IC.

Figure 6:
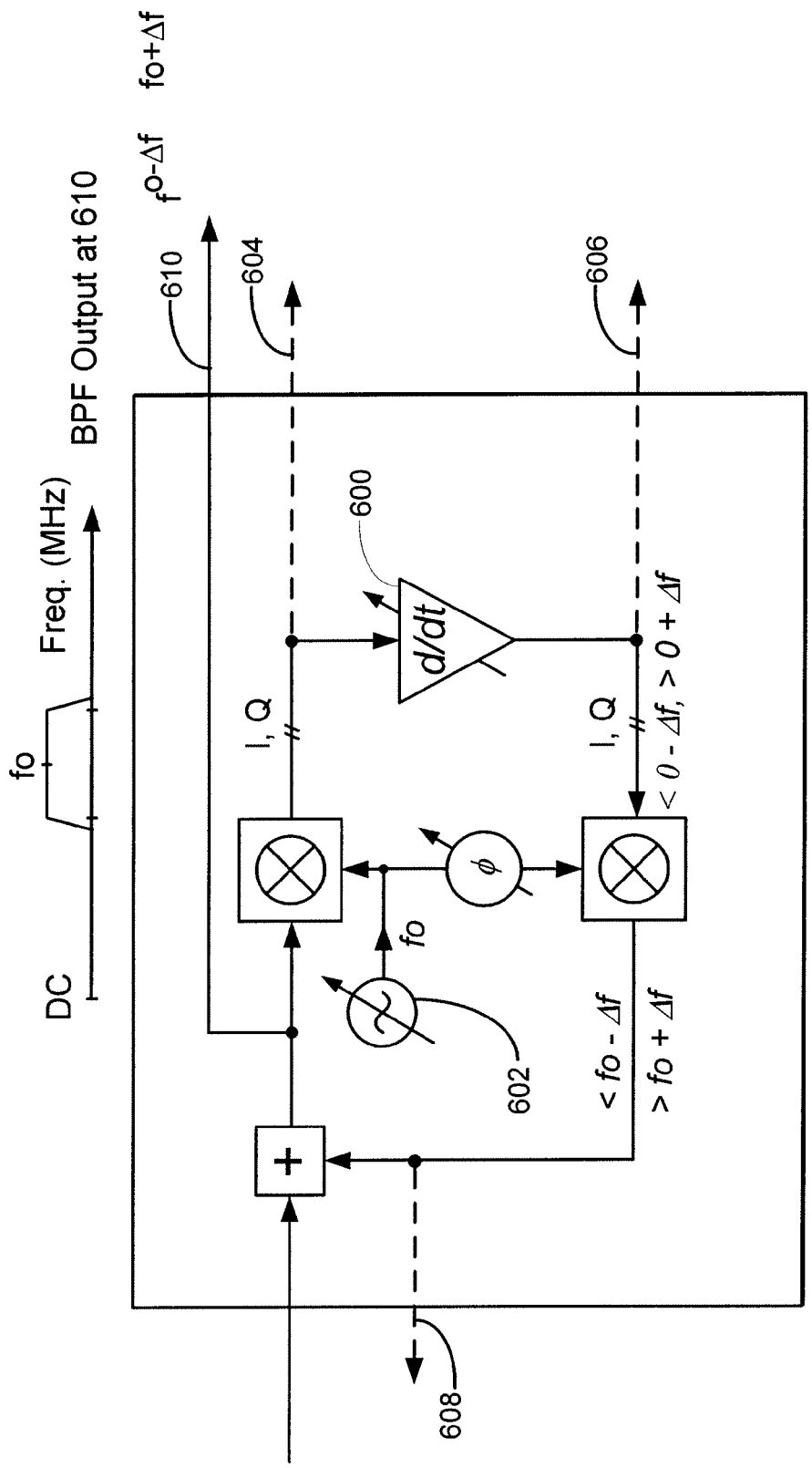
FIG. 6 is a diagram illustrating an example active band-pass filter with tunable center frequency and adjustable bandwidth.

FIG. 6 is a diagram illustrating an example of an active band-pass filter with tunable center frequency and adjustable bandwidth. Referring now to FIG. 6, a band-pass filter is formed using differentiators as the loop filters. The differentiator in general will suppress any feedback at DC. Some negative feedback at DC provides the I and Q DC returns with very narrow bandwidth. This is accomplished, for instance, by bridging or bypassing the differentiators 600 with a DC coupled resistor. This resistor may provide a finite DC gain in the loop. Because the DC path would have a finite bandwidth and would behave as a low-pass filter in the feedback loop of the systems and methods described herein, it would result in the removal of some spectral energy around the signal frequency coinciding with the oscillator frequency. In some embodiments, to reduce the effect of such signal energy removal, the bandwidth of this notch and correspondingly, the bandwidth of the DC return is small.

As illustrated in FIG. 6, the circuit may include various filter outputs. These outputs may include a frequency converted band-pass output 604, a frequency converted band-stop filter 606, a band-stop filter output 608 and a band-pass filter output 610. In this way, the same circuit topology is used to provide multiple types of filters.

In various embodiments of the systems and methods described herein, the active filter may share the oscillator 504 or 602 with the MoCA Rx/Tx. This may, in some cases, save component costs. Additionally, the dynamic range of the up and down mixers in the active notch filter generally may not need to be as high as those of the diplexed transmitter and tuner, for example, the transmitter and the tuner illustrated in FIG. 14. Accordingly, these filter examples do not require as much power and are smaller. This is because the operating conditions and the requirements for the active filter's mixers are not as stringent.

In some embodiments, for example, the filter of FIG. 5, the output of the up-converter mixer 510 processes only a small portion of the total input signal power. For example, one channel might be the only one that is passed through the IF filter and that reaches the mixer 510. With only one channel present and all others removed, the dynamic range requirements of this mixer is lowered. The intercept point of the up-converter mixer 1 may depend on the injection level needed at the combiner. Additionally, any pre-filtering, such as a low-order passive diplexer in front of the active band-stop filter may provide some suppression of the incoming signal, thus reducing the injection level required for cancellation. The injected noise at the desired frequencies, for example, outside of the notch frequencies, should be low enough to not degrade the noise figure beyond acceptable levels at those frequencies.

In some embodiments, an input down-converter mixer is used that causes some non-linear distortion outside of the IF bandwidth. This distortion is allowed to the extent that the distortion terms are subsequently removed by IF filtering. Also, the distortion falling on the frequencies inside the IF bandwidth is allowed in some embodiments, to the extent not to limit the amount of achievable cancellation. The above illustrates cases when the intercept point of the mixer is lower than the intercept point of the protected device. For example, the intercept point of a mixer is lower than the intercept point of a tuner.

In some embodiments, a roofing filter may remove any local oscillator harmonics or harmonic distortion. For example, the filter is inserted before the injection point. In some embodiments, if the local oscillator harmonic(s) fall in the received band and interfere with the desired signal, then harmonic suppression mixers are used.

In some embodiments, the systems and methods described herein might enable diplexer integration in an IC. IC integration of diplexers may facilitate, for example, the integration of TV or satellite tuners with MoCA on the same IC. This can lower system cost and size. Additionally, it might also improve the system's performance.

Figure 7:
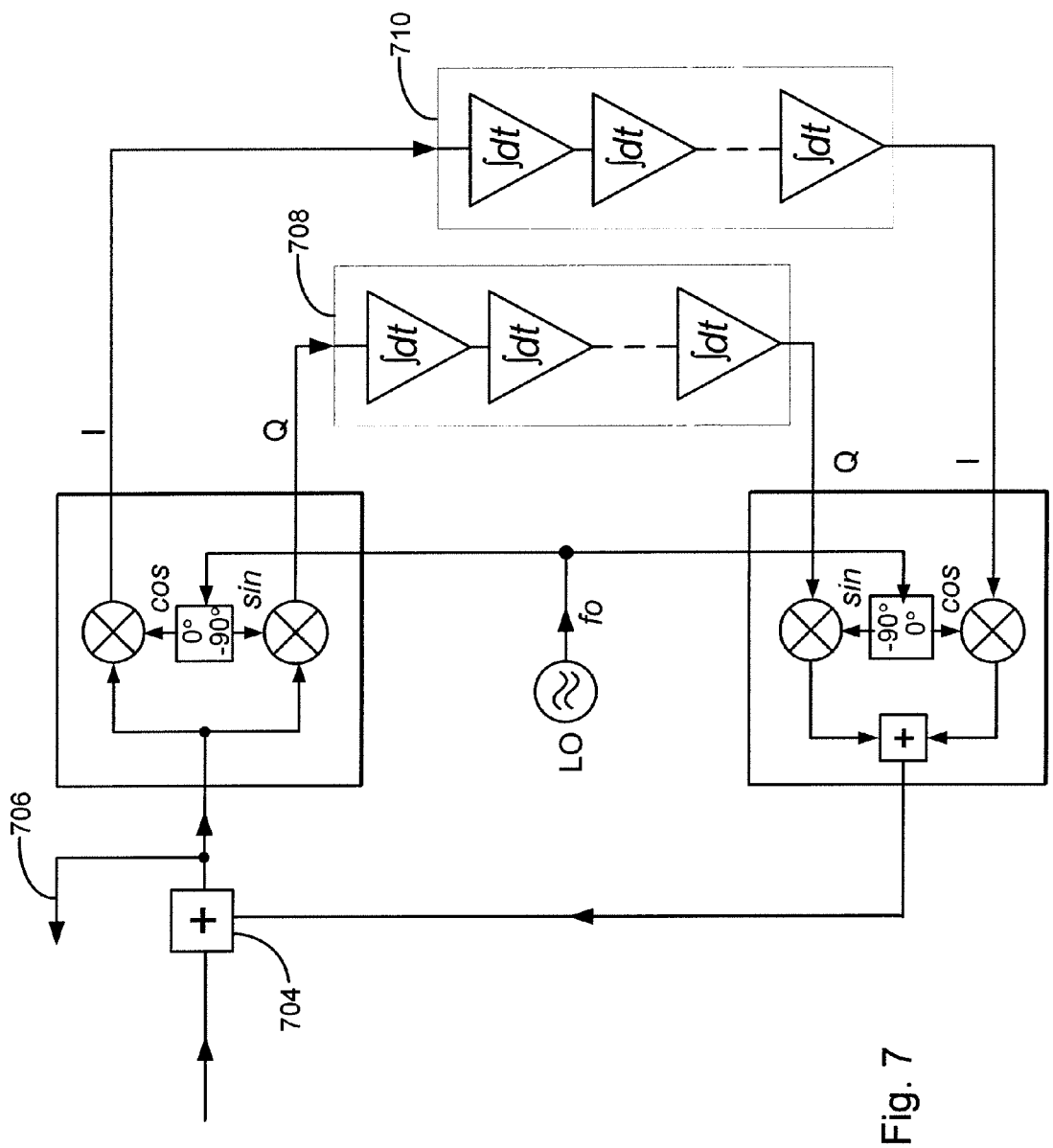
FIG. 7 is a diagram illustrating an example active band-stop filter.

FIG. 7 is a diagram illustrating an example of an active band-stop filter. Referring now to FIG. 7, this example is similar to the example of FIG. 5. As illustrated in FIG. 5, the filter includes two sets of multiple integrators 708 and 710. Additionally, in some embodiments, the summer 704 is a non-directional resistive tap, for example, inside an IC. In another embodiment, the summer 704 is a differential amplifier with its inputs connected to the summation signals. In the example of FIG. 7, a band-stop output 706 is illustrated.

Figure 8:
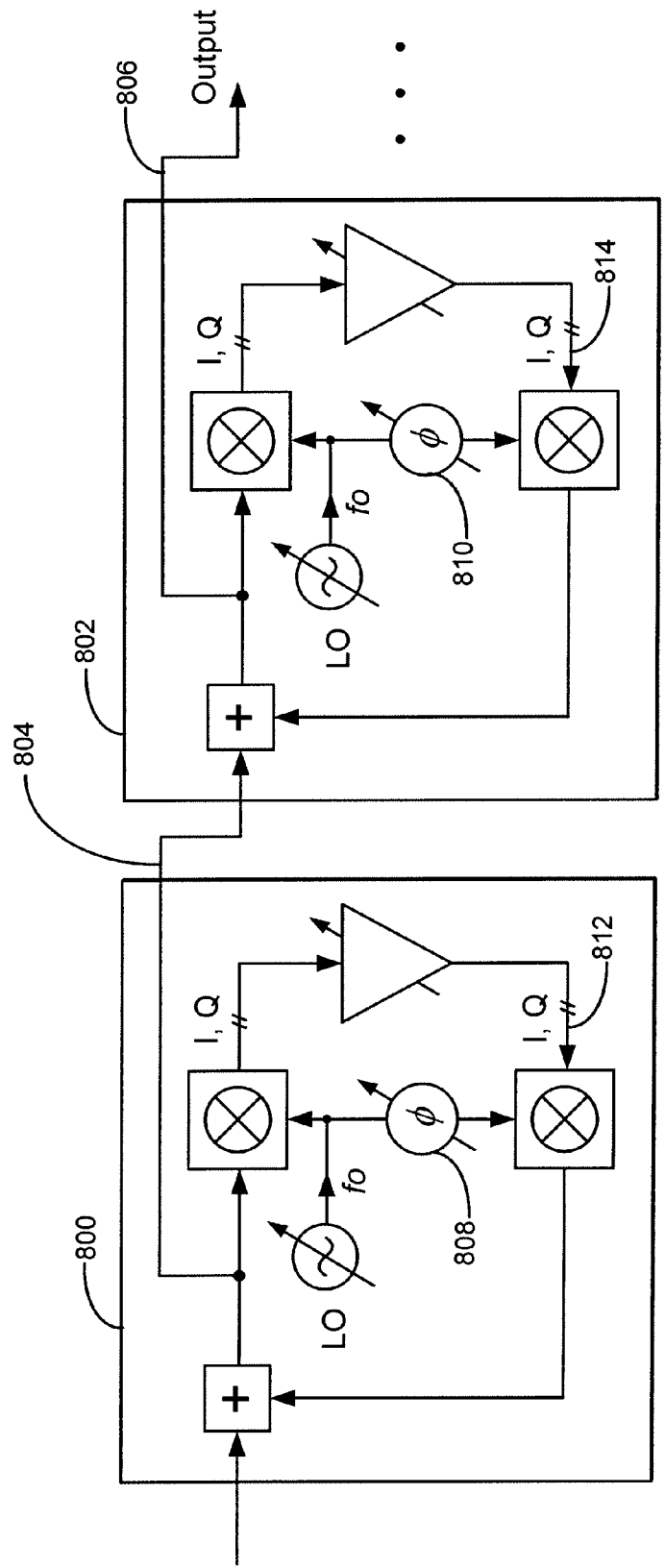
FIG. 8 is a diagram illustrating an example of cascading two filters in accordance with the systems and methods described herein.

FIG. 8 is a diagram illustrating an example of cascading two filters 800 and 802 in accordance with the systems and methods described herein. Referring now to FIG. 8, a first filter 800 may supply its output 804 to the input of a second filter 802. In various embodiments, the output 806 is further cascaded. In this way, the cut-off of the overall filter is steeper.

Figure 9A:
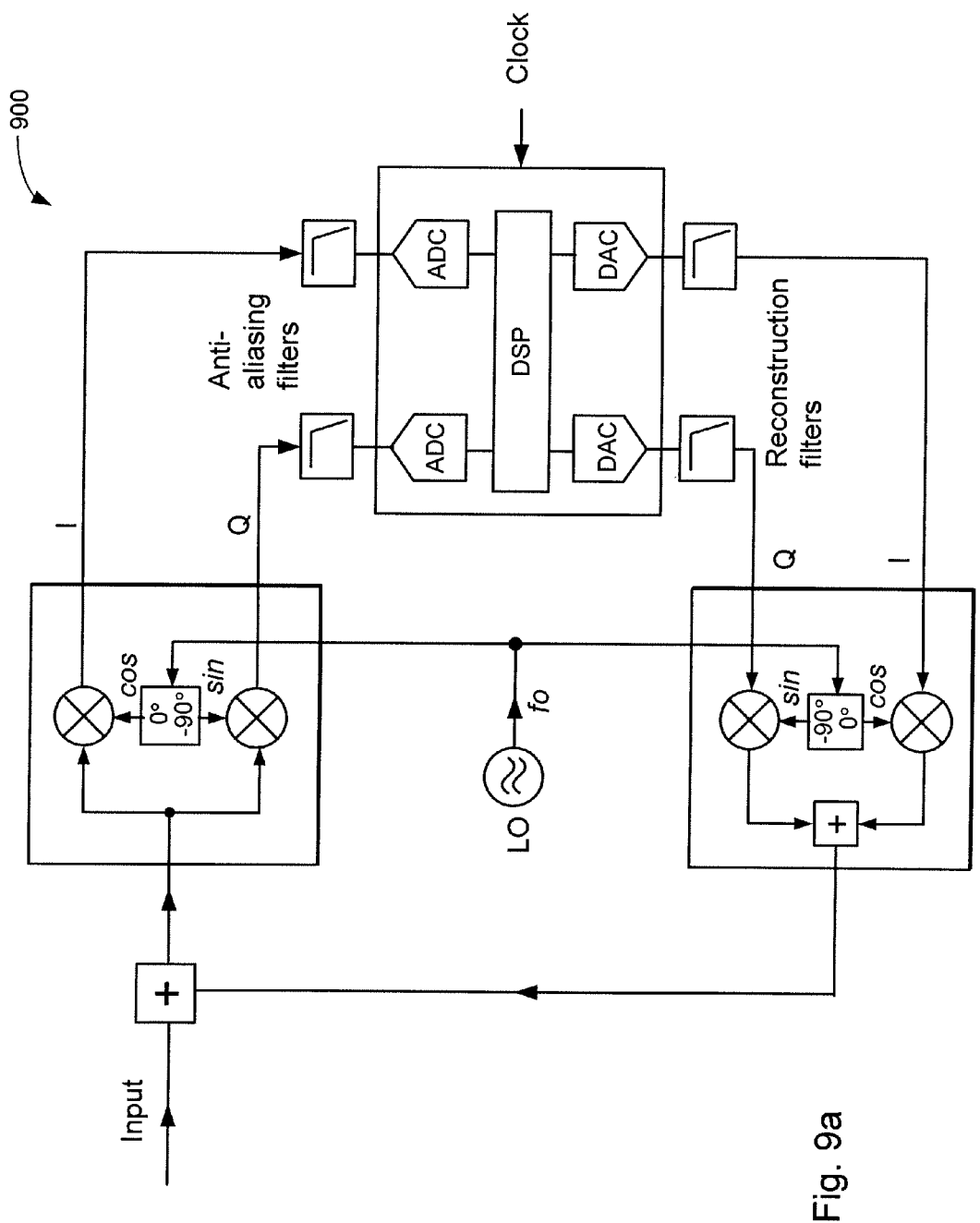
FIGS. 9a and 9b are diagrams illustrating examples of active filters using digital filters in accordance with the systems and methods described herein.

FIG. 9a is a diagram illustrating an example active filter using digital filters in accordance with the systems and methods described herein. Referring now to FIG. 9a, various analog to digital converters and digital signal processors 900 are used to implement the systems and methods described herein. In this way, digital filtering is used to provide a loop filter. In some embodiments, a clock may drive the digital circuitry 900. This clock should be of a high enough frequency so that the signals are processed fast enough that loop delay will not affect the feedback loop. Additionally, in some embodiments, an interference signal's digital base band signal is used in the digital signal processor to implement a feed-forward cancellation system. Such system might use, for example, the circuit of FIG. 4b described above.

Figure 9B:
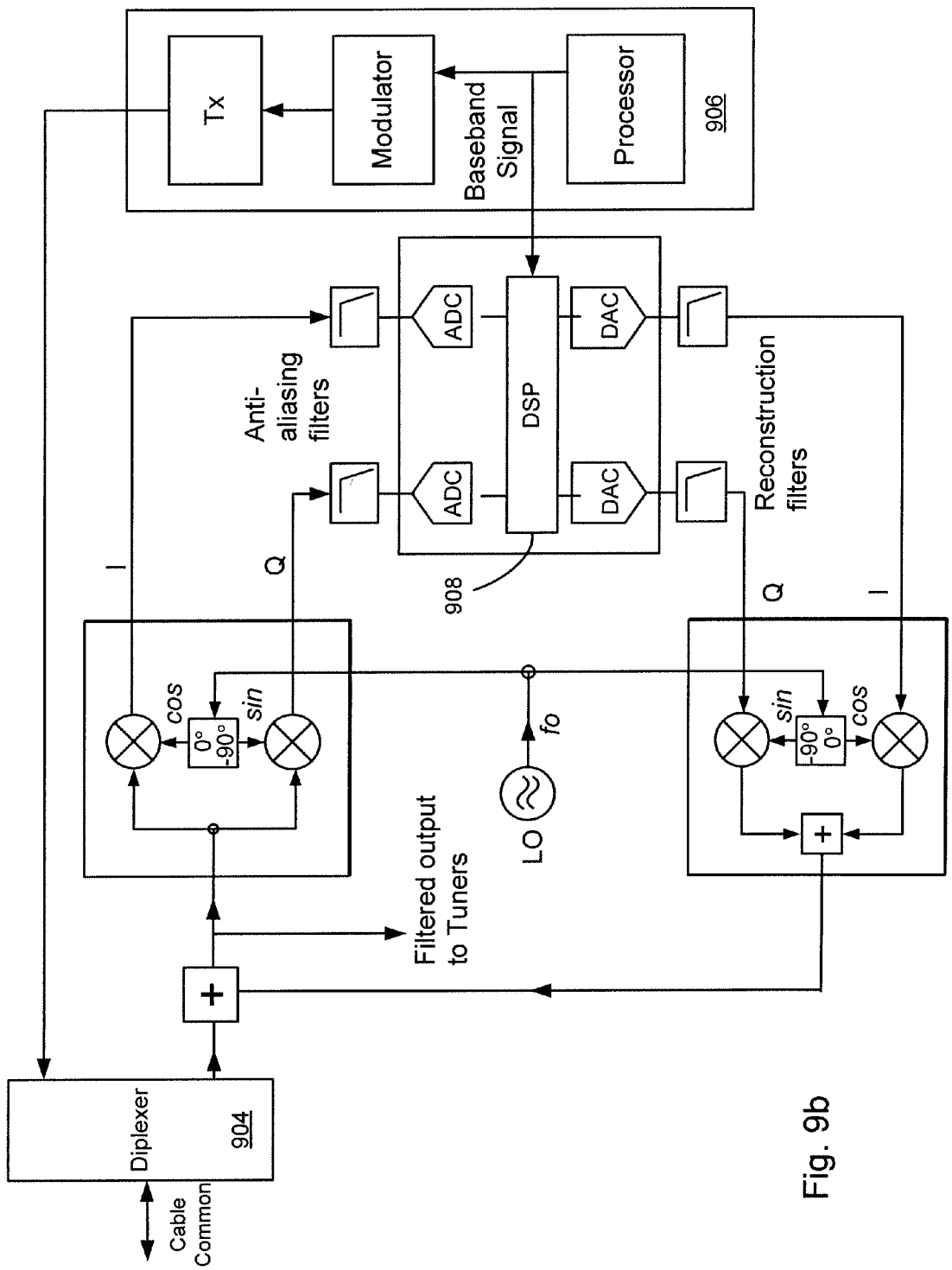

In various other embodiments of the systems and methods described herein, such as in FIG. 9b, a feed-forward method is used. In some embodiments, feed-forward is used during transmission to derive the cancellation signal. For example, this method is used when MoCA's base-band transmission signal is available for processing in the DSP block 908. In these embodiments the transmit baseband signal may need to be processed using an algorithm that achieves a proper delay, phase and amplitude profile of the canceling signal such that cancellation after combining might achieved. The DSP-derived signal drives the up-converter mixer and provide the canceling signal in the active band-stop filter. The feed-forward signal is combined with the feedback signal in order to provide an aggregate canceling signal. In some cases, this signal may have improved phase and delay properties over feedback signal alone. Additionally, it may also provide better matching for cancellation than the feed-forward signal alone.

FIG. 9b is a diagram illustrating an example active filter using digital filters in accordance with the systems and methods described herein. Referring now to FIG. 9b, various analog to digital converters and digital signal processors 908 are used to implement the systems and methods described herein. The filter includes a diplexer 904 coupled to a cable signal and to a filter constructed according to the example embodiment of FIG. 9a. In the example of FIG. 9b a baseband signal is fed forward through a transmit module 906 to the diplexer 904. The feed forward signal is used to cancel unwanted leakage through the diplexer 904.

Figure 1C:
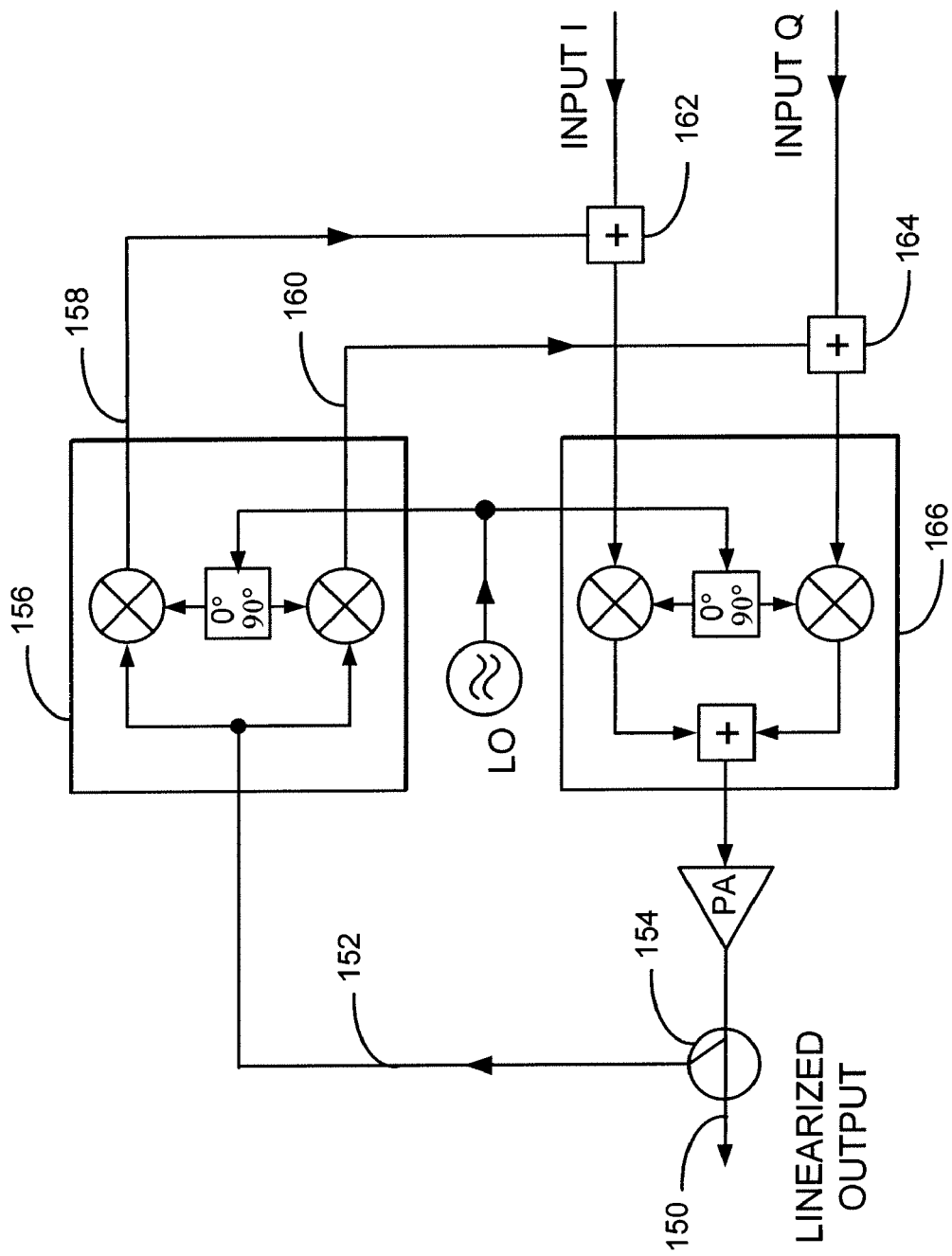
FIG. 1c is a diagram illustrating an example of negative feedback used for linearization of power amplifiers.
Figure 2B:
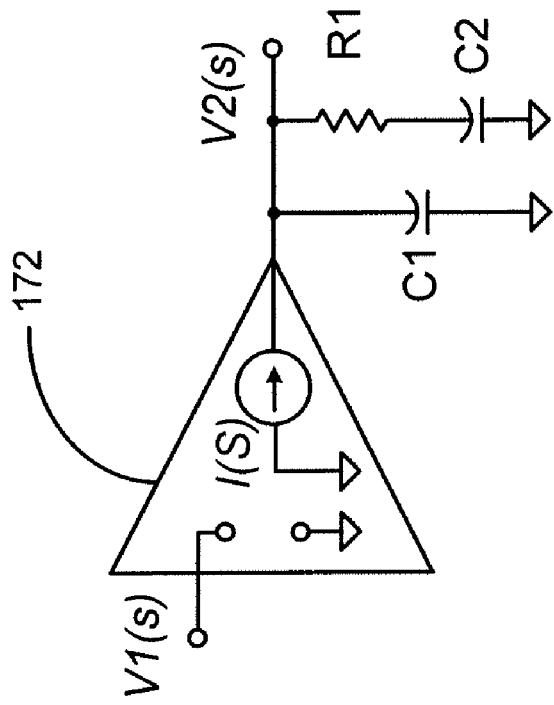
FIG. 2b is a diagram illustrating an example of a charge pump integrator with lead-lag circuit that is used in conjunction with some embodiments of the systems and methods described herein.
Figure 2A:
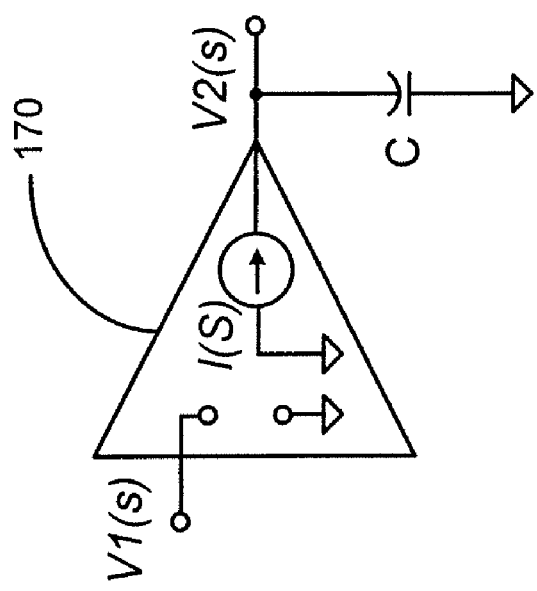
FIG. 2a is a diagram illustrating an example of a charge pump integrator that is used in conjunction with some embodiments of the systems and methods described herein.
Figure 10:
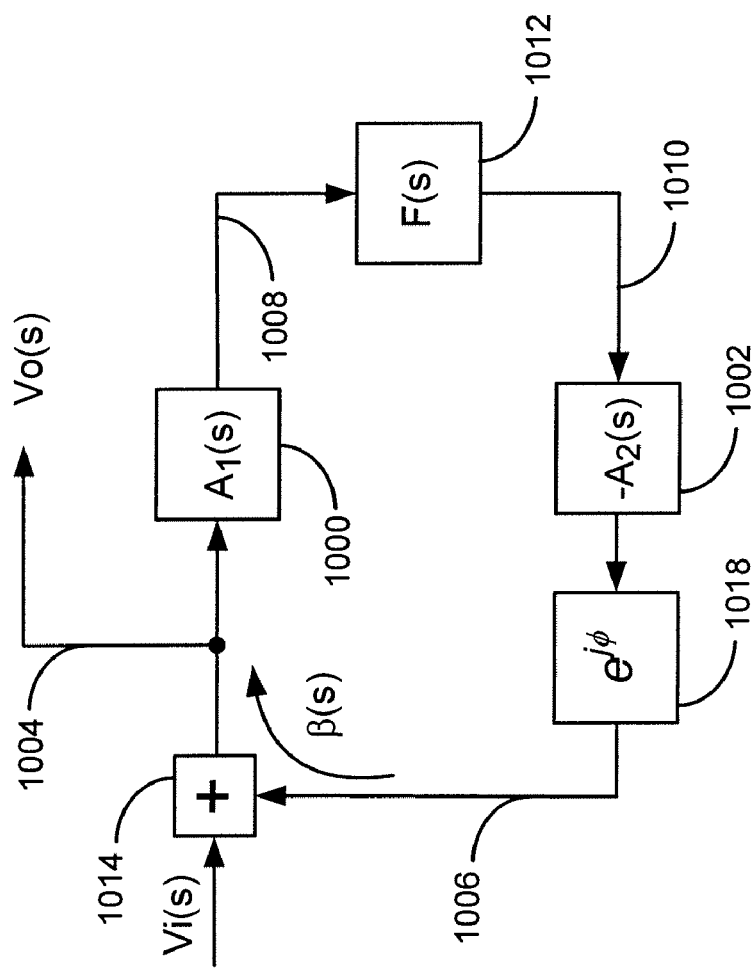
FIG. 10 is a diagram illustrating an example of a simplified equivalent circuit for filtering and loop stability analysis of the systems and methods described herein.

FIG. 10 is a diagram illustrating an example of a simplified equivalent circuit for filtering and loop stability analysis of the systems and methods described herein. Referring now to FIG. 10, the analysis of various embodiments of the systems and methods described herein is facilitated by the simplified equivalent circuit illustrated. The equivalent circuit in FIG. 10 is one possible model of the circuits of, for example, FIG. 2 or 3 as a linear control system.

The circuit of FIG. 10 is analyzed in the Laplace domain. When modeling a system involving a frequency conversion, the circuit of FIG. 10 is not strictly a linear system but is treated as such because the frequency conversion in this case is coherent. This means that the input and the output frequencies are the same. The coherency is due to the reciprocity of the conversion in blocks 1000 and 1002. The input frequency may first be down-converted to zero IF frequency. It may then be up-converted back to the same frequency. The phase information as the signal propagates around the loop is preserved and the frequency conversion becomes transparent and is abstracted out. With the linear representation, the loop equations is derived and the loop behavior analyzed. The loop dynamics may also be analyzed, such as the settling behavior, step response, response to disturbances, etc.

In FIG. 10, the variable s is a well-known Laplace complex frequency $s=\sigma+j\omega$. In the steady state, it simplifies to $s=j\omega$. In considerations of the response at points 1004 and 1006 the imaginary part $\omega$ represents the input RF frequency measured relative to the local oscillator frequency, while in considerations of the signal at 1008 and 1010, the $\omega$ is viewed as a translated IF frequency. For example, it is the difference between the RF and the local oscillator frequency. Accordingly, the meaning of $\omega$ within the equations in this example depends on the location within the circuit. Care should be taken to interpret the equations correctly.

In FIG. 10, the $A_1(s)$ represents the transfer function of the converter 1000. The transfer function includes its complex conversion gain, amplitude and phase as a function of frequency. The $A_1(s)$ absorbs in itself all contributors inside the box 1000. The conversion gain and phase of the mixers, the gain and phase of any other stage that is used in the box 1000, such as the pre or post amplifiers, attenuators, splitters, etc. is absorbed. Similarly, the $A_2(s)$ represents the transfer function of the converter 1002. The F(s) is the transfer function of the integrator 1012 and the $\beta(s)$ represents the coupling coefficient of the combiner 1014. For passive implementation of this combiner, the magnitude of $|\beta(s)| \leq 1$. The term $e^{j\phi}$ in 1018 represents the phase shift $\phi$ inserted in the local oscillator path.

The loop equations of the closed loop system of FIG. 10 is written by applying a simple, well known rule for the closed-loop transfer function between any two points A and B in the loop. Using this equation, A is the point of signal insertion and B the point of observation: Transfer $V_A$ to $V_B = V_B/V_A = $ (Forward Gain A to B)/(1+Open Loop Gain):

$$Vo(s) = \frac{1}{1 + \beta(s)A_1(s)A_2(s)F(s)e^{j\phi}} \cdot Vi(s) \tag{1}$$

The Vo(s) represents the response of the present inventive circuit at the output port 1004, the frequency variable $s=j\omega$ representing the RF frequency measured relative to the local oscillator frequency as explained above. For RF frequencies above the LO frequency, the $\omega$ is positive, while for RF frequencies below the $\omega$ frequencies, the $\omega$ is negative.

As illustrated by Equation (1) the RF frequency response at Vo(s) is approximately the inverted response of the filter F(s). In other words, the RF frequency response is approximately the first order response of Vo(s) and is proportional to the reciprocal quantity $\sim 1/F(s)$. This value approaches 0 for large values of F(s) and approaches 1 for small values of F(s).

The stop band of the loop filter 1012, is where the transmission value of $|F(s)| \approx 0$. Eq. (1) yields a transfer of 1. In other words, eq. (1) indicates that this is a band-pass region. In this region the filter 1012 passes the signal with a maximum transfer rate. Accordingly, it is subtracted out by the negative feedback. Conversely, inside the pass-band of the loop filter 1012 where $|F(s)| \to \infty$ the eq. (1) will converge to a low or zero transfer (approaching a total rejection). Accordingly, it will not be subtracted out by the negative feedback. This is true regardless of whether integrators or differentiators are used as the loopback filters.

Equation (1) also reveals that the bandwidth of a filter circuit in accordance with some embodiments depends on all terms appearing in the denominator of eq. (1). All these terms in aggregation determine the value and frequency dependency of the denominator. Accordingly, these terms determine the bandwidth of the filter. For instance, to attain the 3 dB bandwidth of the filter at the desired RF frequency, the parameters including the coupling coefficient $\beta$, the mixer 1000 gain $A_1$ and the mixer 1002 gain $A_2$ is adjusted in addition to the integrator 1012 parameters to achieve the required F(s) characteristics for this bandwidth. The multiplicity of the variables affecting the filter bandwidth may provide additional freedom and flexibility in the design. The ability to adjust or control the bandwidth by varying or controlling one or more of these terms may also be provided. For instance, tuning the parameters of filter components, such as a variable MOS resistor, switching the capacitive or resistive components can be used in conjunction with various embodiments of the systems and methods described herein.

With electronically controllable elements, the bandwidth control is accomplished dynamically. This is used, for example, to control the bandwidth in various embodiments of the systems and methods described herein. Additionally, this is used in conjunction with a closed loop that optimizes the bandwidth in order to optimize certain other parameters, for example to achieve the best bit-error rate (BER) dynamically in digital communication applications. Other means of bandwidth control, such as using a variable gain baseband amplifier or an attenuator to control the mixers 1000 and 1002, pre or post mixer gain, or the pre or post loop filter gain, or some combination of these is used with the systems and methods described herein.

Figure 11:
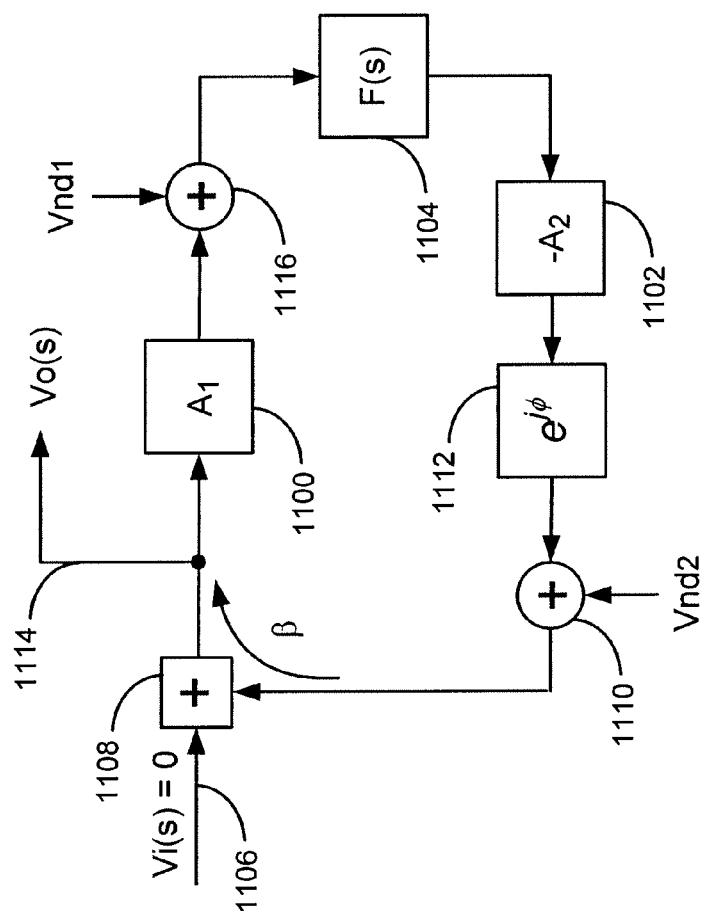
FIG. 11 is a diagram illustrating a simplified representation of one embodiment of the systems and methods described herein.

Equation (1) can be used to analyze the stability of the feedback system of FIG. 10. As with any other closed loop control system, the denominator in the equation must be kept away from zero. When the denominator of Equation (1) is near zero the system is near the unstable region. In the unstable region, the open loop gain approaches a value of −1. When the open loop gain is near −1 it may multiply together with the inversion that occurs in the loop to create positive feedback. This might occur, for example, in the amplifier $A_2$ as illustrated in FIGS. 10 and 11.

When the magnitude of the open loop gain, which is a product $\beta(s) \cdot A1(s) \cdot A2(s) \cdot F(s) \cdot e^{j\Phi}$ (where $s=j\omega$), approaches the value of 1 along with its phase approaching 180° the system is unstable. In some embodiments, the combined phase shift of $\beta(s)$, $A_1(s)$, $A_2(s)$, F(s) and $e^{j\Phi}$ is selected to be less than 180°. For a correct interpretation of the effect of the LO phase shift $\phi$, it's important to keep in mind that for RF frequencies above the LO frequency, the $\omega$ per above is positive, while for RF frequencies below the LO frequencies, the $\omega$ is negative. In both cases the $\phi$ represents a phase advance. However, while this phase advance improves the phase margin when $\omega$ is positive, it may reduce the phase margin for negative $\omega$. This should be kept in mind when optimizing the $\phi$, perhaps use the LO phase shift feature primarily to improve a frequency asymmetry that may exist in the system, i.e. the phase shift asymmetry between RF frequencies below the LO frequency compared with RF frequencies above the LO frequency.

Additionally, the various embodiments are designed with sufficient margin. This is most importantly at frequencies where the loop gain is around unity. In general, the dominant phase shift normally occurs in the filter F(s), but additional undesired phase shift, mainly a phase-lag is likely to occur in the amplifiers, mixers and elsewhere in the system. In some embodiments this is due to circuit and transmission delays, parasitic inductance and capacitance, frequency response roll-off, etc.

To achieve stability in some prior systems only lower-order filters exhibiting lower phase-shifts and delays are used. These systems are restricted to only first order filters, which do not have more than −90° phase shift over the entire frequency range. This allows for another 90° phase budget for everything else, including the safety margin. In some cases, a first order filter may limit the achievable performance and rejection rates. This may reduce the overall value and applicability of these filters. Various embodiments of the systems and methods described herein may not have such limitations. This is possible because of the architecture of some embodiments. For example, by using integrators as the loop filter elements, higher order filters can be used. This is because integrators exhibit constant phase shift of −90° at all frequencies.

FIG. 11 is a diagram illustrating a simplified representation for analysis purposes of one embodiment of the systems and methods described herein. Referring now to FIG. 11, an equivalent representation of the circuit of FIG. 5 is discussed. FIG. 11 is a simplified version of the circuit of FIG. 5. The circuit of FIG. 11 forms a linear control system that can be used for the analysis of noise and distortion effects in the loop. This analysis can be performed in the Laplace domain. This diagram can be used to evaluate the loop effects on the noise and nonlinear distortions generated by the conversion blocks 1100 and 1102. To simplify the analysis, the frequency variable s is illustrated only in the filter block 1104 term F(s)—the variable s is dropped from other blocks since their noise and distortions have little or no dependency on frequency. In one example analysis, the input signal Vi(s) at 1106 is set to zero, so the only signals under consideration are the noise and the distortion terms generated by the circuit itself. While it is necessary to have the input signal present to generate nonlinear distortions, in the analysis below it is assumed that the distortion is a linear signal injected in the loop, which can then be analyzed as a linear term. What might not be evaluated with this linear model is the effect of the loop on the nonlinear distortion levels as a function of the applied signal levels and the distortion characteristics of the loop elements.

The Vnd1 is the combined noise and distortion generated inside the conversion block 1100 referenced to the output of the block. It is illustrated in the diagram as being inserted in the summing circuit 1116 at the output of 1100. The noise level being referenced to the output of 1100 represents the thermal noise increased by the noise figure and the gain of the block 1100. The distortion represents the nonlinear distortions generated inside the converter 1100 and referenced at its output. Similarly, Vnd2 is the noise and distortion of the conversion block 1102, also referenced to its output. This noise and distortion is modeled as being inserted via the summer 1100 at the output of 1112. In the example of FIG. 11, the linear loop equations can be used to analyze the effects of these terms injected in the loop and how the loop responds to them. The loop will treat the distortion terms falling inside the circuit's pass-band differently from those falling outside, in the stop-band. Only the signals in the stop-band of the filter circuit will circulate in the loop, while the signals in the pass-band will generally be stopped by the loop filter 1104 and will generally not circulate in the loop.

The equations for the circuit of FIG. 11 is derived similarly as before, by applying the intra-loop transfer rule:

$$Vo(s) = \frac{\beta \cdot A_2 \cdot F(s)}{1 + \beta \cdot A_1 \cdot A_2 \cdot F(s) \cdot e^{j\phi}} \cdot Vnd1 + \frac{\beta}{1 + \beta \cdot A_1 \cdot A_2 \cdot F(s) \cdot e^{j\phi}} \cdot Vnd2 \quad (2)$$

Eq. (2) illustrates the noise and distortion of the circuit at the output port 1114, when the noise and distortion terms are injected at the outputs of the mixers 1100 and 1102 as illustrated in FIG. 11. The noise and distortion is processed differently at the two outputs—unlike in eq. (1) the Vo(s) is no longer related simply via the gain A1(s), because the two noise/distortion terms are injected at different points in the loop. Two frequency regions are of interest—the pass-band and the stop-band of the filter circuit.

In the pass-band of the circuit, eq. (2) simplifies to:

$$|F(s)| \approx 0 \Rightarrow Vo(s) \cong \beta \cdot Vnd2 \quad (3)$$

Eq. (3) computes the noise and distortion passed by the loop from the output of the converter 1102 onto the output port 1114. It illustrates that both noise and distortion terms is scaled by the coupling coefficient β (e.g. attenuated if a passive coupler is used). In order not to degrade the noise level at the output of the filter 1104, the noise level conveyed by the loop per eq. (3) is kept below the incoming noise level. The same is true for the distortion terms.

The implication is that the dynamic range of the mixer 1102 needs to be sufficiently high in order to keep the distortion terms in this mixer at acceptable levels. These distortion would be added to the desired signal thus degrading it.

In the stop-band of the filter circuit eq. (2) simplifies to:

$$|F(s)| \to \infty \Rightarrow Vo(s) \cong \frac{Vnd1}{A_1} \quad (4)$$

The terms in eq. (4) are outside the pass-band and illustrate the transfer of noise and distortion around the loop in that frequency region.

Due to imperfections of the I and Q phase and amplitude balance in the up-converter mixer, there is a certain amount of oscillator leakage and unwanted sideband present at the output. This is inserted back into the circuit along with the desired feedback signal. Accordingly, the local oscillator term might potentially be increased. Additionally, unwanted sideband that may exist within the down-converter mixer due to its own imperfections may also be increased. These terms may typically be in the order of −35 dBc and may limit the amount of achievable rejection to approximately the same order as the errors themselves. If needed, a calibration of the I, Q balance is used to reduce the degradation.

In some communications systems utilizing time-division-duplexing (TDD) for two-way duplex operation the transmitter modulator can be reused. For example, during the receive time slot in a MoCA system, when the transmitter is dormant, the transmitter modulator can be reused to as the up-converter mixer for the receiver. By re-using the mixer, hardware complexity may be reduced and cost and size can be reduced.

Some embodiments of the systems and methods described herein reuse hardware. For example, various TDD systems reuse hardware when filtering received signals. In order to perform received signal filtering some embodiments may include various adaptations. For example, during the receive (Rx) time slot, the receive demodulator IQ outputs is tapped into the transmit (Tx) modulator inputs through the appropriate filters. Additionally, the transmit frequency retuned to the receive frequency and the transmit signal diverted to the input 1106 of coupler 1108. In this mode, the system may provides filtering function to the received signal; during the transmit time slot, the system returns to normal.

In some embodiments, this method may cause a risk of increased leakage back through the input during the receive time slots from the transmitter that is generating energy and injecting the energy into the receive path. Generally, the risk of the back-leakage with the various embodiments of these systems and methods are very low. This is because the signals that may potentially leak back into the input cable in this case would be synchronous and indistinguishable from the received signals. For example, in various embodiments, input signals may be feed back. Accordingly, the leakage effect would be similar to or much lower than the already existing effect of the input signal reflections from the input stages/LNA due to mismatches/limited return loss and as such would cause no harm.

Figure 12:
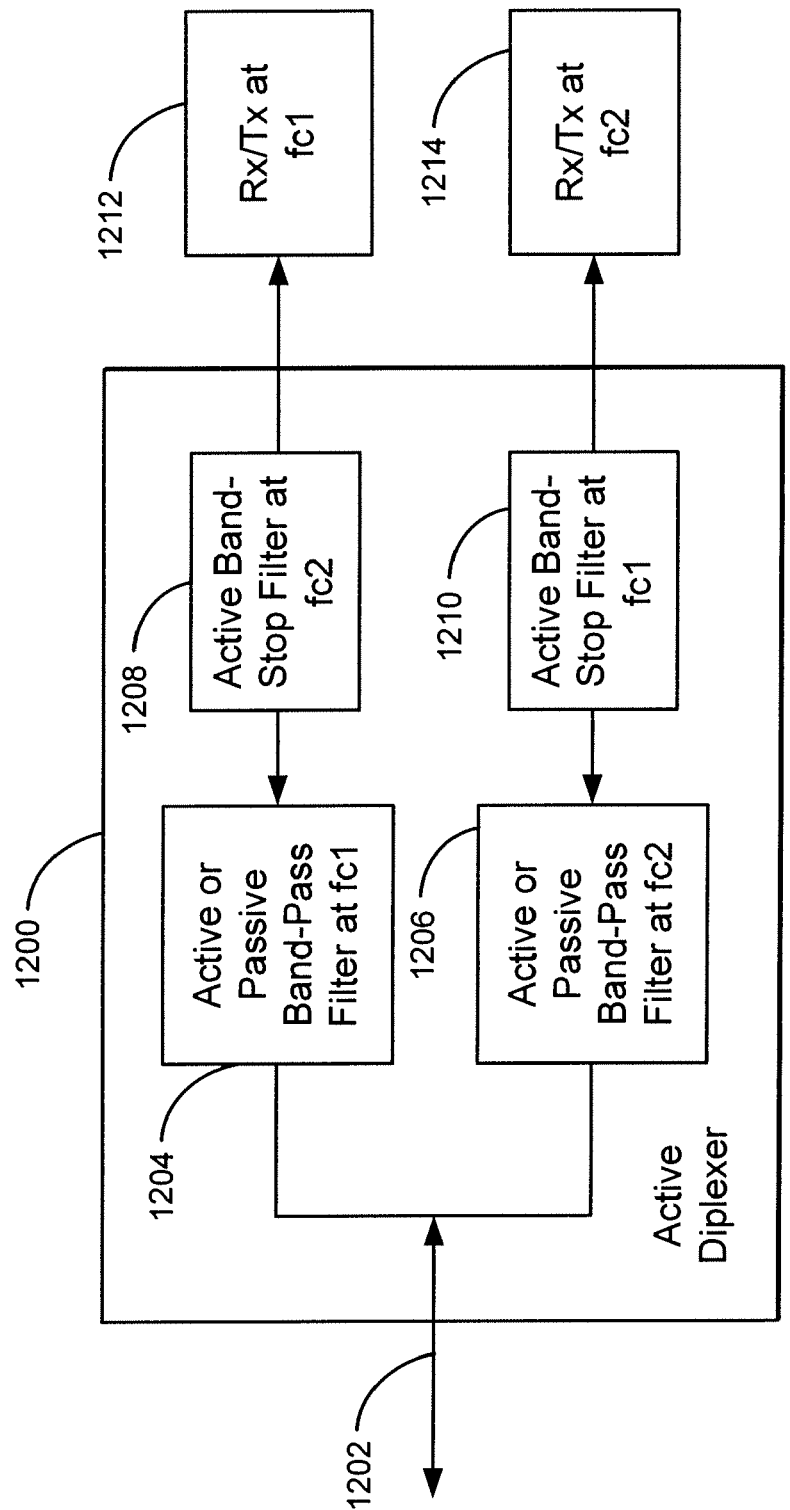
FIG. 12 is a diagram illustrating an example of an active diplexer in accordance with the systems and methods described herein.

FIG. 12 is a diagram illustrating an example active diplexer 1200 in accordance with the systems and methods described herein. Referring now to FIG. 12, this example may include a common connection 1202 and some embodiments may include multiple active or passive band-pass filters 1204 and 1206 coupled to the common connection 1202. Active or passive band-pass filters 1204 and 1206 are coupled to active stop filters 1208 and 1210 respectively, which are further coupled to Rx/Tx devices 1212 and 1214 respectively. In this way the signals that each Rx/Tx devices 1212 and 1214 are designed to receive and transmit are passed between the devices 1212 and 1214 and common connection 1202. Additionally, signals intended for the device 1212 are filtered out on the path to device 1214 and signals intended for the device 1214 are filtered out on the path to device 1212.

Figure 13:
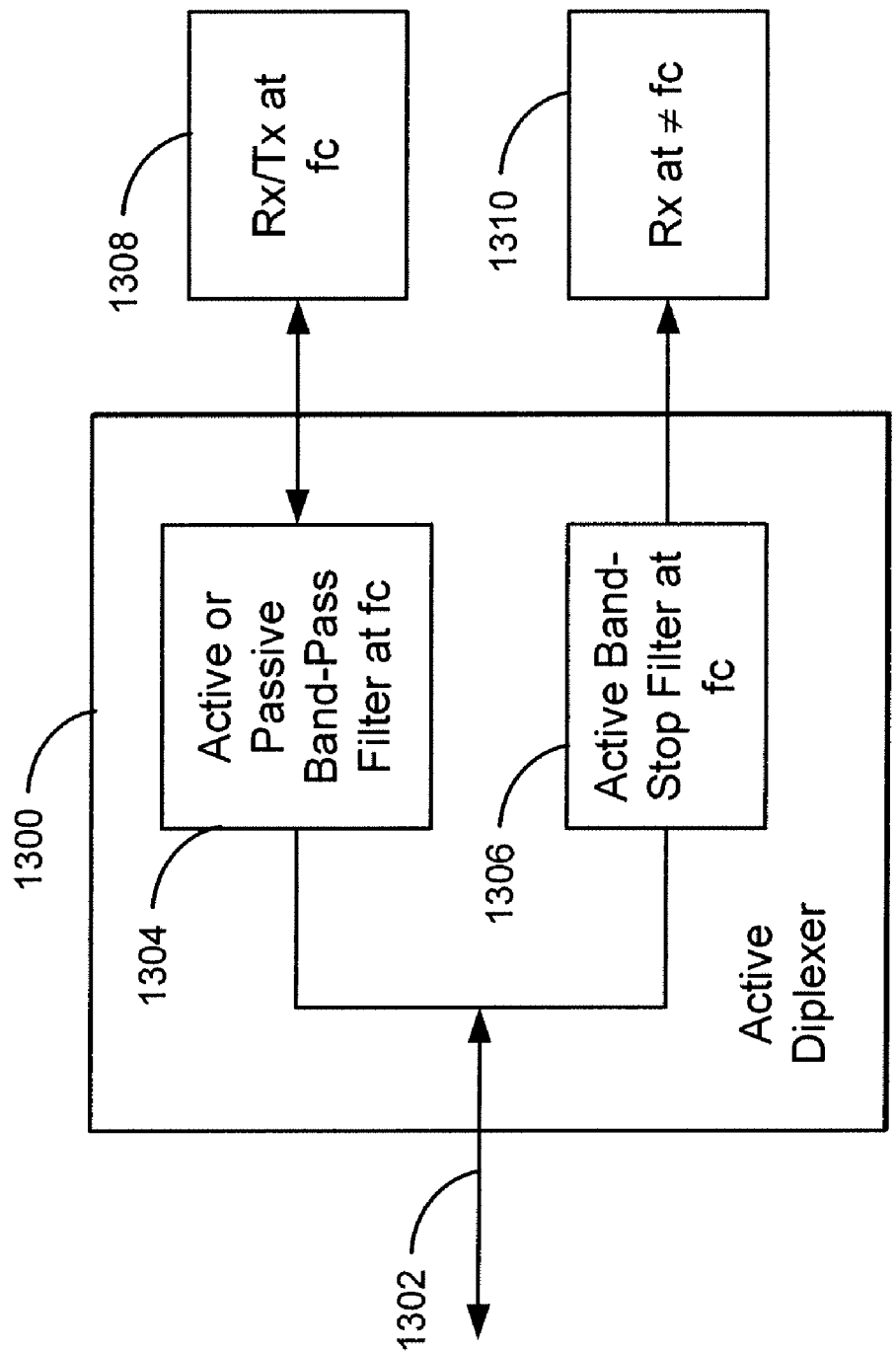
FIG. 13 is diagram illustrating another example of an active diplexer in accordance with the systems and methods described herein.

FIG. 13 is a diagram illustrating another example active diplexer 1300 in accordance with the systems and methods described herein. Referring now to FIG. 13, an example that is used in conjunction with cable television is illustrated. In some embodiments, a cable signal 1302 is connected to an active or passive band-pass filter 1304 and an active band stop filter 1306. In various embodiments, both filters 1304 and 1306 are centered at a frequency fc. In this way signals that need to be transmitted and received by Rx/Tx 1308 is separated from receive only signals, such as television programming received by receiver 1310.

Figure 14:
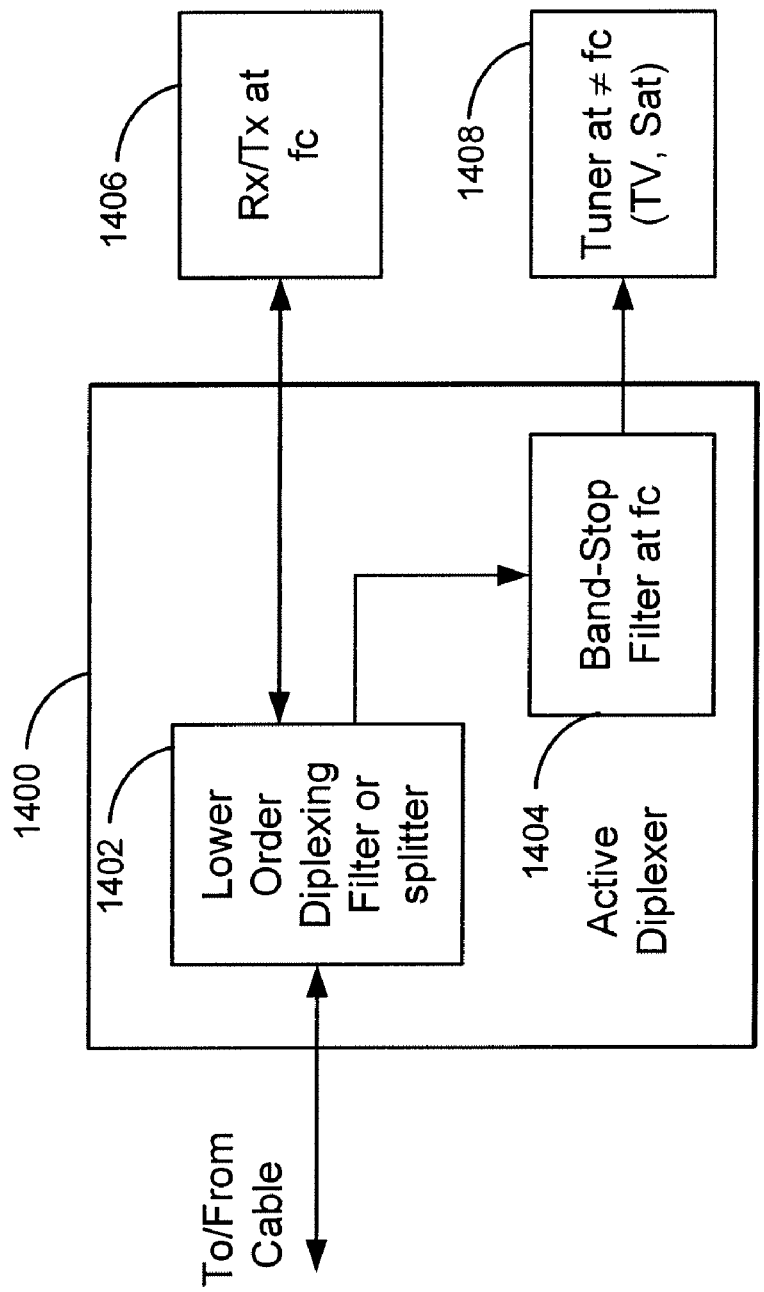
FIG. 14 is diagram illustrating another example of an active diplexer in accordance with the systems and methods described herein.

FIG. 14 is a diagram illustrating another example active diplexer 1400 in accordance with the systems and methods described herein. Referring now to FIG. 14, another example of a cable system is illustrated. In this embodiment, a lower order diplexing filter or splitter 1402 is used in conjunction with a band-stop filter 1404. In this way signals that need to be transmitted and received by Rx/Tx 1406 are separated from receive only signals, such as television programming received by the receiver 1408. Additionally, the lower order filter 1402 may be sufficient because the filter 1404 uses various embodiments of the systems and methods described herein to provide sharp filter frequency response.

Figure 15:
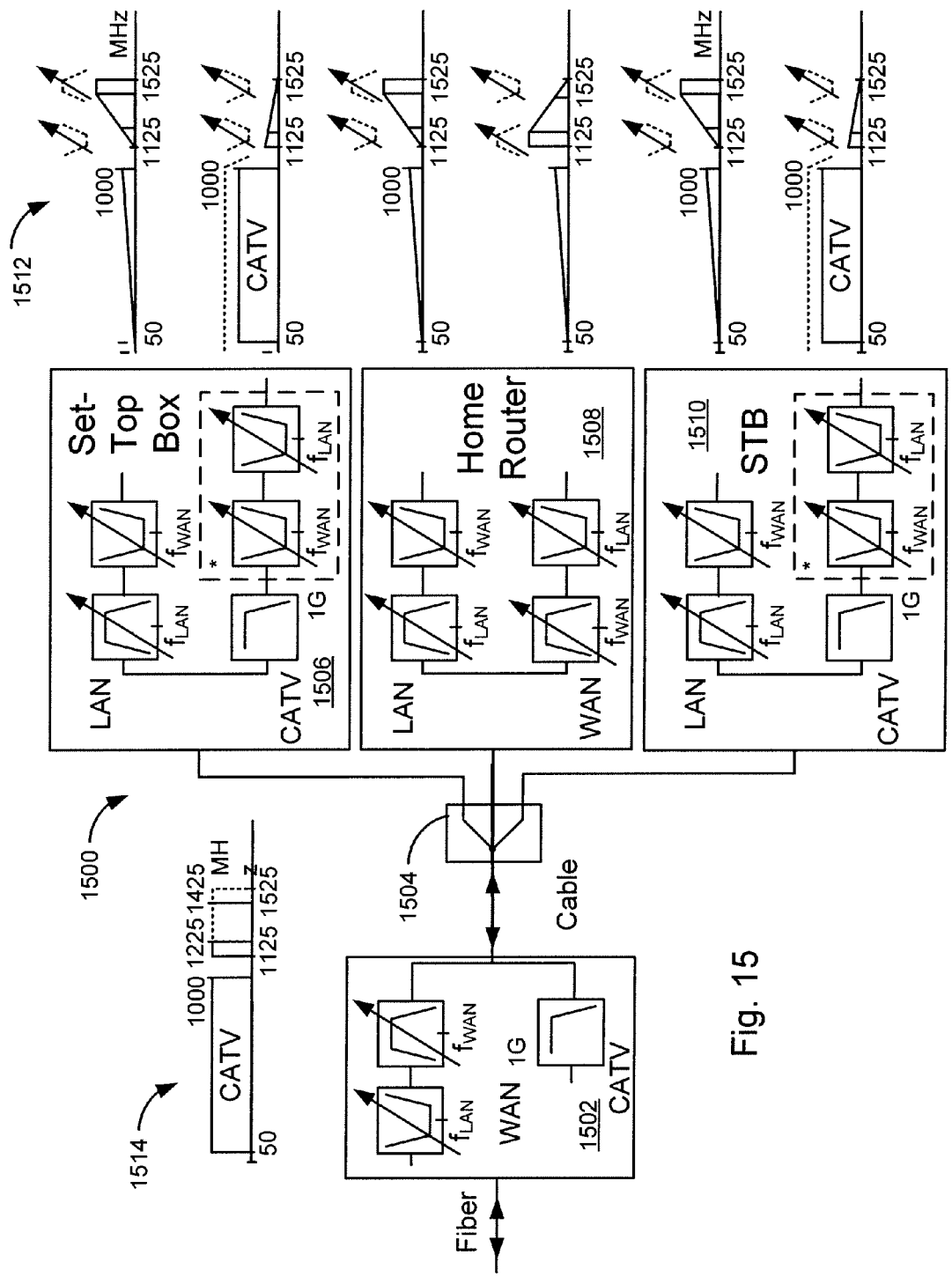
FIG. 15 is a diagram illustrating an example of a scheme using active tunable diplexers with fiber to the home in accordance with the systems and methods described herein.

FIG. 15 is a diagram illustrating an example system that may use active tunable diplexers with a fiber to the home system in accordance with the systems and methods described herein. Referring now to FIG. 15, this example illustrates a system 1500 that might include an optical terminal 1502 as a point of entry into, for example, a home. This system might then be split using, for example, a signal splitter 1504. The signal can be split into, for example, a cable signal for a set top box 1506, a network signal for a home router 1508 and an additional set-top box 1510. The optical terminal 1502 communicates with the home router 1508 at the WAN frequency $f_{WAN}$, and the STBs 1506, 1510 and the home router 1508 inter-communicate at the LAN frequency $f_{LAN}$. Each of the band-stop filters and band-pass filters illustrated in FIG. 15 are fixed-tuned or tunable/programmable, depending on the application and requirements.

FIG. 15 also illustrates example frequency responses 1512 for each set of filters 1506, 1508 and 1510. These responses are based on an input signal spectrum 1514 illustrated in FIG. 15. This frequency spectrum 1514 includes cable television signals as well as other signals. These signals are used in conjunction with the set-top boxes 1506 and 1510 to provide cable television. Additionally, computer networking signals are processed using the home router 1508.

Figure 16:
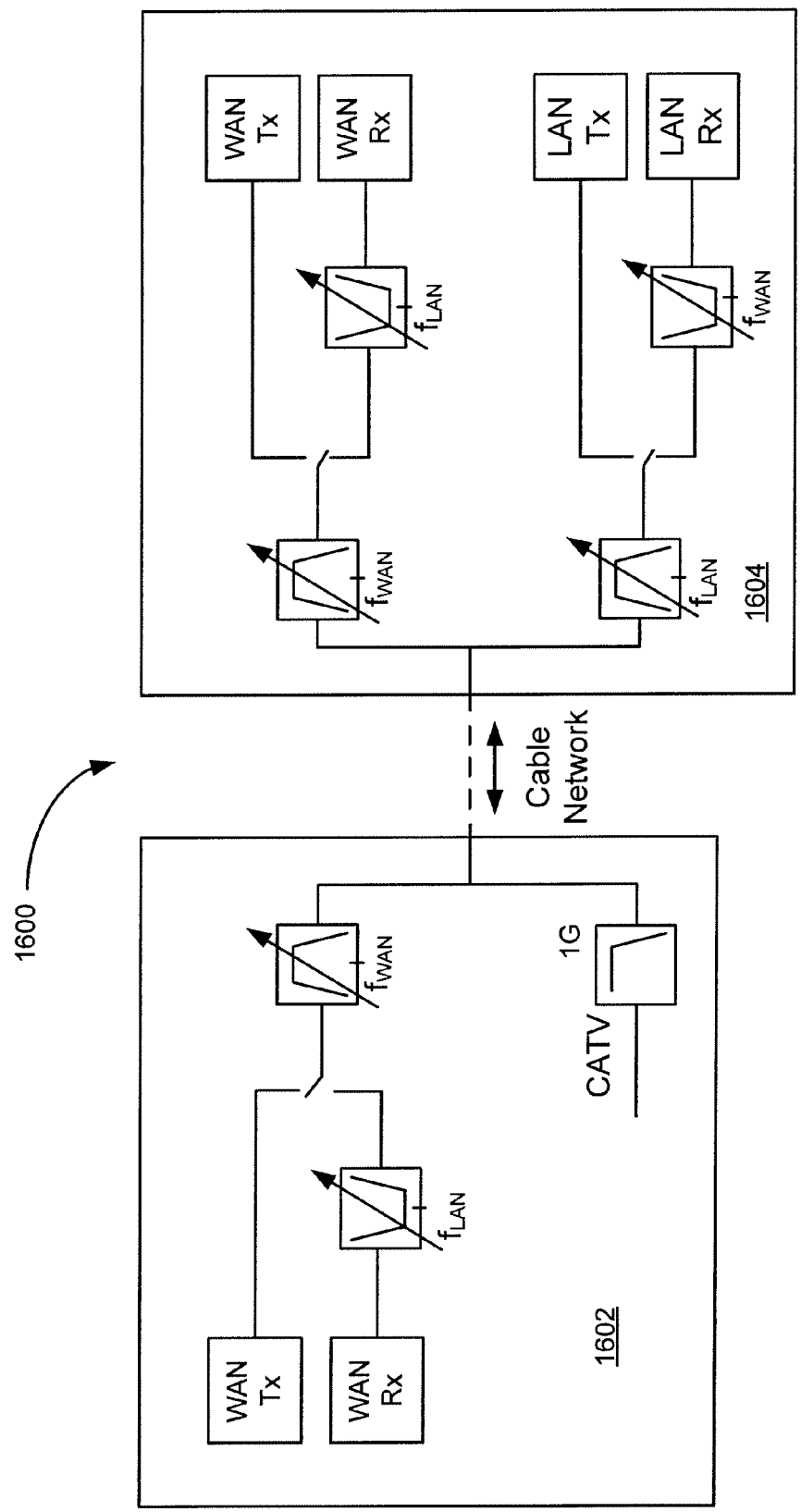
FIG. 16 is a diagram illustrating an example optical network and home router connection in accordance with the systems and methods described herein.

FIG. 16 is a diagram illustrating an example optical network and home router connection 1600 in accordance with the systems and methods described herein. Referring now to FIG. 16, an optical transceiver diplexer 1602 is illustrated. In some embodiments, the diplexer 1602 is connected to a home router diplexer 1604 over a cable network 1606. Accordingly, as illustrated in the example a local area network and a wide area network are provided over the optical network.

Figure 17:
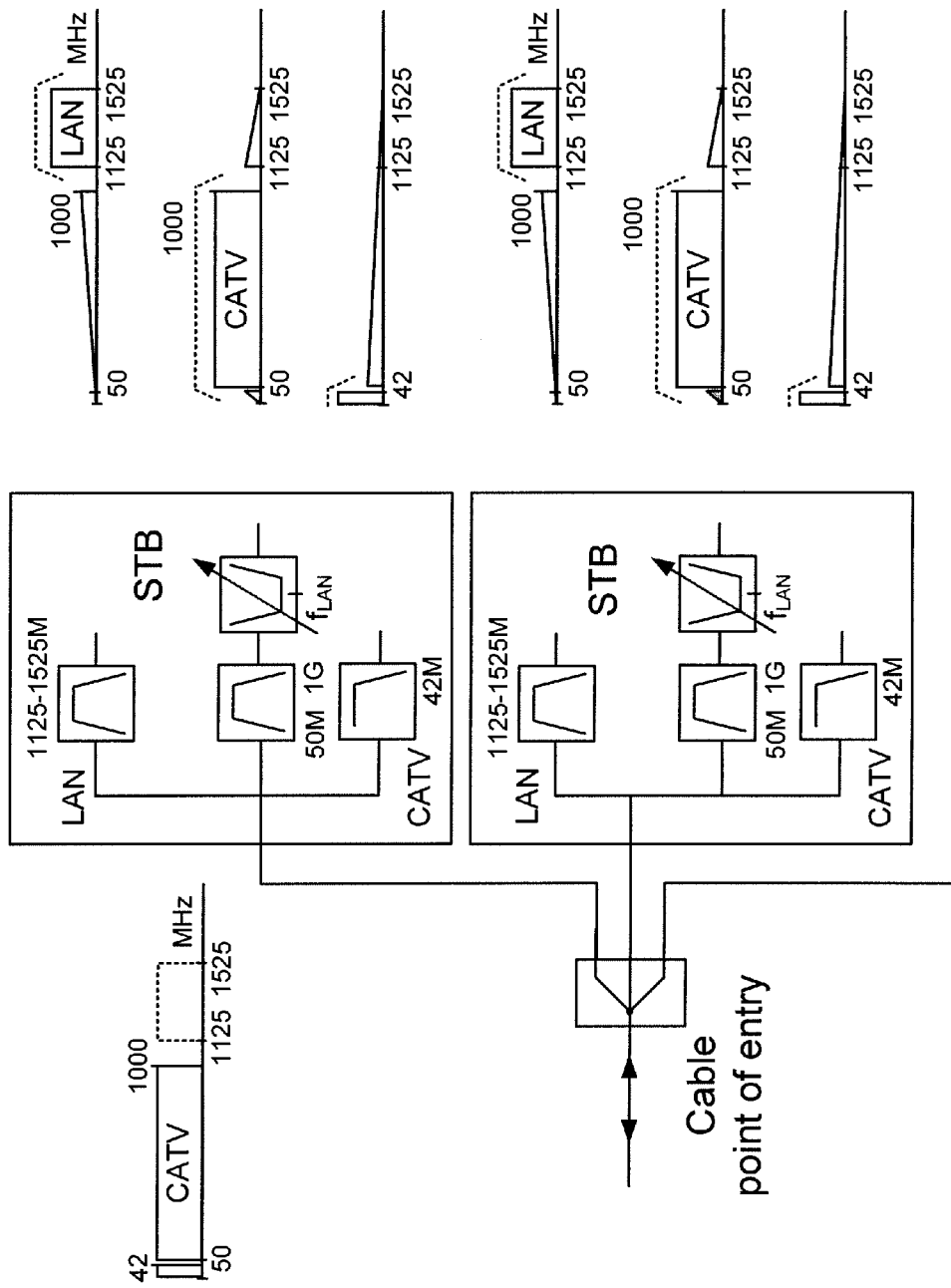
FIG. 17 is a diagram illustrating an example scheme using active tunable diplexers with cable television in accordance with the systems and methods described herein.

FIG. 17 is a diagram illustrating an example scheme using active tunable diplexers with cable television 1700 in accordance with the systems and methods described herein. Referring now to FIG. 17, this example includes various set top boxes 1702 and 1704. These set top boxes 1702 and 1704 can be configured to filter cable television signals and computer network signals.

In various embodiments, one or more set top boxes are connected to a cable entry point. Each set top box filters the cable signal into local area network signals and cable television signals. Accordingly, cable television, internet access and other telecommunication services are provided using the systems and methods described herein.

FIG. 18 is a flowchart illustrating a method in accordance with one embodiment of the systems and methods described herein. Referring now to FIG. 18, at a step 1800, an input signal is down-converted. For example, the signal is down-converted using a direct frequency down-conversion to zero IF. Additionally, this down-conversion might also use I and Q mixers. In some embodiments, a quadrature local oscillator drives these mixers.

In a step 1802, the down-converted signal is filtered by integration or differentiation. For example, in some embodiments, the down-converted signal is filtered using an integrator, differentiator or some combination of multiple integrators or differentiators. Using integrators or differentiators may provide increased phase margin.

In a step 1804, the down-converted and filtered signal is up-converted. This conversion might occur, for example, with a local oscillator phase advanced relative to the phase of the signal used for the down-conversion. The filtered and up-converted signal might then be combined with the input signal in a step 1806. In this way a signal is filtered to, for example, eliminate or reduce unwanted signals.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

With MoCA and other network environments, the network nodes typically include a network device with a processor, controller or other processing module configured to perform device functions. The scheduling and other network management features discussed above is performed by the device processing module, or a dedicated network module may be provided with the device to enable it to function as a network node.

As used herein, a controller may be implemented using a general-purpose or special-purpose processing engine such as, for example, a microprocessor, controller, or other control logic. In one embodiment, some or all of device functionality can be implemented using an ASIC, PLD or other circuit device, including a processor core and memory blocks. Accordingly, the controller can be implemented using a processing core such as, for example, a RISC microprocessor core. Examples of RISC processor cores include ARM cores available from Advanced RISC Machines Ltd, located in Cambridge, England, and MIPS RISC cores available from MIPS Technologies, Inc., of Mountain View, Calif., although other cores are available as well. In this example, the controller is connected to a bus or other communication medium to facilitate interaction with other components of the device. A central bus structure or other communication media and architectures are acceptable.

As used herein, the term module might describe a given unit of functionality that can be performed in accordance with one or more embodiments of the present invention. As used herein, a module may be implemented utilizing any form of hardware, software, or a combination thereof. For example, one or more processors, controllers, ASICs, PLAs, logical components, software routines or other mechanisms may be implemented to make up a module. In implementation, the various modules described herein can be implemented as discrete modules or the functions and features described can be shared in part or in total among one or more modules. In other words, as would be apparent to one of ordinary skill in the art after reading this description, the various features and functionality described herein is implemented in any given application and can be implemented in one or more separate or shared modules in various combinations and permutations. Even though various features or elements of functionality is individually described or claimed as separate modules, one of ordinary skill in the art will understand that these features and functionality can be shared among one or more common software and hardware elements, and such description shall not require or imply that separate hardware or software components are used to implement such features or functionality.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that is available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention is described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases is absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A filter circuit comprising:
a down-converter including and I and Q mixers;
a calculus operator circuit, coupled to the down-converter and configured to filter the down-converted signal, wherein the calculus operator circuit provides a constant phase shift at all frequencies;
an up-converter including I and Q mixers, coupled to the calculus operator circuit; and
a combining circuit, coupled to the up-converter and configured to combine the filtered, up-converted signal and the input signal.

2. The filter circuit of claim 1, wherein the calculus operator circuit comprises an integrator circuit.

3. The filter circuit of claim 1, wherein the calculus operator circuit comprises a differentiator circuit.

4. The filter circuit of claim 1 further comprising a local oscillator having an output, wherein the up-converter uses a local oscillator signal and the local oscillator signal is advanced by a phase shift $\phi°$ relative to the output of the local oscillator.

5. The filter circuit of claim 1, wherein the center frequency is tunable and the bandwidth is adjustable.

6. The filter circuit of claim 1, wherein the calculus operator circuit comprises a cascade of integrators.

7. The filter circuit of claim 1, wherein the calculus operator circuit comprises a cascade of differentiators.

8. The filter circuit of claim 1, further comprising an additional filter cascaded to the first filter by coupling the input of the second filter to the output of the output of the first filter.

9. The filter circuit of claim 1, wherein the filter comprises a digital filter.

10. A circuit comprising:
a down-converter including I and Q mixers;
a filter, coupled to the down-converter and configured to filter the down-converted signal;
a phase advance circuit coupled to the filter and configured to change the phase of a filtered signal relative to the filtered down-converted signal;
a calculus operator configured to filter the down-converted signal, coupled to the down-converter and the phase advance circuit, wherein the calculus operator circuit provides a constant phase shift at all frequencies;
an up-converter including I and Q mixers, coupled to the phase advance circuit; and
a combining circuit, coupled to the up-converter and configured to combine the filtered, up-converted signal and the input signal.

11. The circuit of claim 10, wherein the calculus operator circuit comprises an integrator circuit.

12. The circuit of claim 10, wherein the calculus operator circuit comprises a differentiator circuit.

13. The circuit of claim 10, further comprising an additional filter cascaded to the first filter by coupling the input of the second filter to the output of the first filter.

14. The circuit of claim 10, wherein the filter comprises a digital filter.

15. A method of filtering a signal using a circuit, comprising:
performing a direct frequency down-conversion of the signal;
filtering the down-converted signal by using a calculus operator circuit, wherein the calculus operator circuit provides a constant phase shift by all frequencies;
up-converting the signal back to the original frequency; and
combining the up-converted signal in phase opposition with the input signal.

16. The method of claim 15, wherein the filtering comprises using an integrator to filter the down-converted signal.

17. The method of claim 15, wherein the filtering comprises using a differentiator to filter the down-converted signal.

18. The method of claim 15, further comprising inserting a phase advance circuit into a mixer path.

19. The method of claim 15, wherein the filtering comprises cascading a series of integrators.

20. The method of claim 15, wherein the filtering comprises cascading a series of differentiators.

21. The method of claim 15, further comprising cascading a series of filter circuits.

22. The method of claim 15, wherein the filtering comprises using a digital filter.

23. An active diplexer comprising:
a first circuit including:
a down-converter;
a filter, coupled to the down-converter and configured to filter the down-converted signal, the filter comprising a phase advance circuit and a calculus operator circuit, wherein the calculus operator circuit provides constant phase shift to all frequencies;
an up-converter, coupled to the filter; and
a combining circuit, coupled to the up-converter and configured to combine the filtered, up-converted signal and the input signal; and
a second circuit coupled to the first circuit.

24. The active diplexer of claim 23, wherein the second circuit comprises a filter including a phase advance circuit.

25. The active diplexer of claim 23, wherein the second circuit comprises an active filter.

26. The active diplexer of claim 23, wherein the second circuit comprises a passive filter.

27. The active diplexer of claim 23, wherein the second circuit comprises a lower order filter.

28. The active diplexer of claim 23, wherein the second circuit comprises a band-stop filter.

29. A circuit comprising:
a filter circuit including:
a down-converter including I and Q mixers;
a calculus operator circuit, coupled to the down-converter and configured to filter the down-converted signal, wherein the calculus operator circuit provides constant phase shift to all frequencies;
an up-converter including I and Q mixers, coupled to the calculus operator circuit; and
a combining circuit, coupled to the up-converter and configured to combine the filtered, up-converted signal and the input signal; and
a feed forward circuit coupled to the filter and configured to provide a feed forward signal to the filter.

30. The circuit of claim 29, wherein the feed forward signal is coupled to the filter circuit through to diplexer.

31. The filter circuit of claim 29, wherein the calculus operator circuit comprises an integrator circuit.

32. The filter circuit of claim 29, wherein the calculus operator circuit comprises a differentiator circuit.

* * * * *